(12) United States Patent
Egashira et al.

(10) Patent No.: US 7,626,921 B2
(45) Date of Patent: Dec. 1, 2009

(54) WIRELESS COMMUNICATION METHOD USING OFDM AND OFDM TRANSMITTER AND RECEIVER THEREOF

(75) Inventors: Yoshimasa Egashira, Yokohama (JP); Yasuhiko Tanabe, Kawasaki (JP); Kazumi Sato, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 485 days.

(21) Appl. No.: 11/669,478

(22) Filed: Jan. 31, 2007

(65) Prior Publication Data

US 2007/0201351 A1 Aug. 30, 2007

(30) Foreign Application Priority Data

Feb. 1, 2006 (JP) ............................... 2006-024969

(51) Int. Cl.
*H04J 11/00* (2006.01)
(52) U.S. Cl. ..................... 370/208; 370/203; 370/281; 370/282; 370/491
(58) Field of Classification Search .................. 370/208, 370/203, 281, 282, 491; 375/260
See application file for complete search history.

(56) References Cited

FOREIGN PATENT DOCUMENTS

JP 3682853 6/2005

OTHER PUBLICATIONS

Hiroyuki Kamata, at al., "Effects of IQ Imbalance and Effective Compensation Scheme on the MIMO-OFDM Communication System", Technical Report of IEICE, WBS2004-57, A. P2004-238, RCS2004-325, MoMuC2004-108, MW2004-235, Mar. 2005, 6 pages.
W.R. Kirkland et al., "I/Q distortion correction for OFDM direct conversion receiver", Electronics Letters, vol. 39, No. 1, Jan. 9, 2003, pp. 131-133.
U.S. Appl. No. 12/140,613, filed Jun. 17, 2008, Egashira et al.

*Primary Examiner*—Aung S Moe
*Assistant Examiner*—Steven Medina
(74) *Attorney, Agent, or Firm*—Oblon, Spivak, McClelland, Maier & Neustadt, L.L.P.

(57) ABSTRACT

A wireless communication method includes generating and transmitting an OFDM signal containing a first OFDM symbol possessing a first transmitting pilot signal and a second transmitting pilot signal respectively allocated to a first subcarrier and a second subcarrier being symmetric with respect to a center frequency on a frequency axis, and a second OFDM symbol possessing a third transmitting pilot signal and a fourth transmitting pilot signal respectively allocated to the first subcarrier and the second subcarrier, wherein a difference between a product of a first transmitting pilot signal and a complex conjugate of a fourth transmitting pilot signal and a product of a third transmitting pilot signal and a complex conjugate of a second transmitting pilot signal is non-zero.

15 Claims, 4 Drawing Sheets

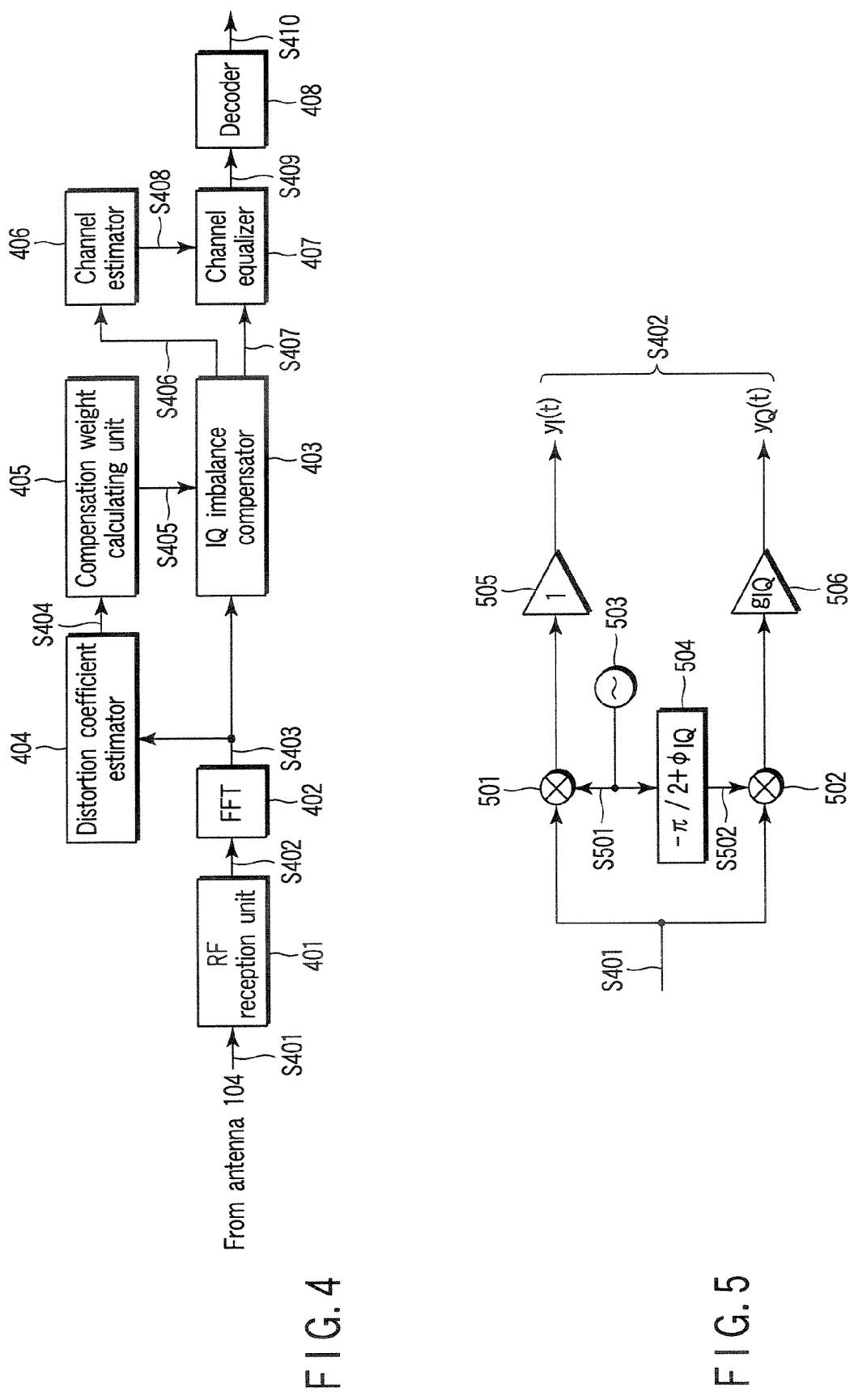
F I G. 4
F I G. 5

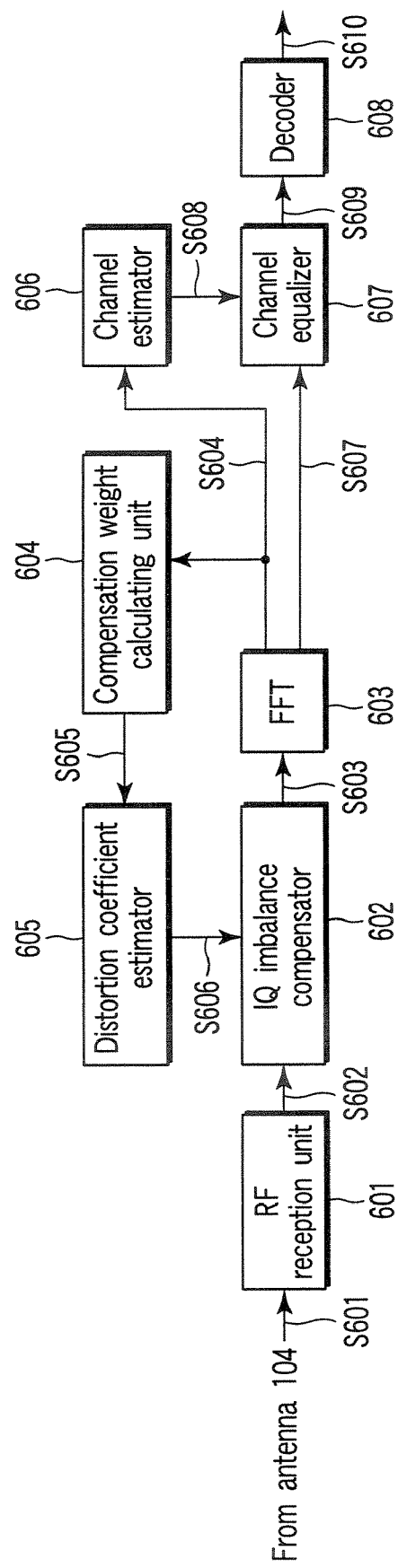
F I G. 6

WIRELESS COMMUNICATION METHOD USING OFDM AND OFDM TRANSMITTER AND RECEIVER THEREOF

CROSS-REFERENCE TO RELATED APPLICATIONS

This application is based upon and claims the benefit of priority from prior Japanese Patent Application No. 2006-024969, filed Feb. 1, 2006, the entire contents of which are incorporated herein by reference.

BACKGROUND OF THE INVENTION

1. Field of the Invention

The present invention relates to a wireless communication method using orthogonal frequency division multiplexing (OFDM) and an OFDM transmitter and receiver thereof.

2. Description of the Related Art

In an environment where a plurality of signals arrive with different propagation delay time, such as in a multipath channel, intersymbol interference becomes a major factor of deteriorating communication quality. An orthogonal frequency division multiplexing (OFDM) is known as a scheme to reduce the effect of intersymbol interference which occurs when receiving signals with different propagation delay times.

Generally, in a wireless receiver, a quadrature orthogonal demodulator is used when converting a received high frequency band signal into a baseband signal by frequency conversion. When the quadrature demodulator consists of an analogue circuit, IQ imbalance occurs in the quadrature demodulator due to the imperfection of the analogue circuit. The IQ imbalance is an amplitude error and phase error which occur between an inphase component and an orthogonal component. When the IQ imbalance occurs in the quadrature demodulator, two subcarrier signals among the OFDM signal subcarriers, which are symmetric with respect to a center frequency, interfere with each other. Such mutual interference significantly deteriorates receiving quality.

To compensate IQ imbalance, i.e., to eliminate mutual interference caused by IQ imbalance between the subcarriers positioned symmetric with respect to a center frequency, a technique is proposed in which an amplitude and phase change and mutual interference quantity are estimated for each subcarrier, and the compensation is performed based on such estimation result (JP-A 2001-119364 (KOKAI)). In this technique, in order to estimate the amplitude and phase change caused by IQ imbalance and the mutual interference quantity between subcarriers positioned symmetric with respect to a center frequency, a preamble signal for channel estimation having a particular structure is transmitted.

In the technique described in JP-A 2001-119364 (KOKAI), to estimate the amplitude and phase change which differs for each subcarrier and the mutual interference quantity between the subcarriers positioned symmetric with respect to a center frequency, it is necessary to transmit across all subcarriers a particularly structured channel estimation preamble which doubles the usual length. Therefore, an overhead of the preamble signal for channel estimation is large.

BRIEF SUMMARY OF THE INVENTION

According to an aspect of the invention, there is provided a wireless communication method comprising generating an OFDM signal containing a first OFDM symbol having a first transmitting pilot signal and a second transmitting pilot signal respectively allocated to a first subcarrier and a second subcarrier being symmetric with respect to a center frequency on a frequency axis, and a second OFDM symbol having a third transmitting pilot signal and a fourth transmitting pilot signal respectively allocated to the first subcarrier and the second subcarrier, a difference between a product of the first transmitting pilot signal and a complex conjugate of the fourth transmitting pilot signal and a product of the third transmitting pilot signal and a complex conjugate of the second transmitting pilot signal being non-zero; transmitting the OFDM signal; receiving the OFDM signal by using orthogonal demodulation to output a received OFDM signal; extracting a first received pilot signal and a second received pilot signal in a first OFDM symbol zone of the received OFDM signal, the first receiving pilot signal and the second receiving pilot signal respectively corresponding to the first subcarrier and the second subcarrier; extracting a third received pilot signal and a fourth received pilot signal in the second OFDM symbol zone of the receiving OFDM signal, the third receiving pilot signal and the fourth receiving pilot signal respectively corresponding to the first subcarrier and the second subcarrier; estimating from the first received pilot signal and the third received pilot signal a first coefficient representing a change component of each of an amplitude and a phase which are occurred in the first subcarrier; estimating from the second received pilot signal and the fourth received pilot signal a second coefficient representing an interference component provided to the second subcarrier by the first subcarrier; calculating from the first coefficient and the second coefficient a weight to be used for compensating influences of an amplitude error and a phase error occurred in the received OFDM signal upon the orthogonal demodulation; compensating the receiving OFDM signal in accordance with the calculated weight to obtain a compensated OFDM signal; and decoding the compensated OFDM signal.

BRIEF DESCRIPTION OF THE SEVERAL VIEWS OF THE DRAWING

FIG. 4 is a block diagram showing an OFDM receiver according to an embodiment.

FIG. 5 is a block diagram showing a simplified model of an RF reception unit in FIG. 4.

FIG. 6 is a block diagram showing an OFDM receiver according to another embodiment.

DETAILED DESCRIPTION OF THE INVENTION

Hereinafter, embodiments of the present invention will be described in detail with reference to the accompanying drawings. According to the following embodiments, in an OFDM wireless communication system, a pilot signal generally used for frequency synchronization or timing synchronization is given a certain condition and transmitted. Accordingly, without the use of a special preamble signal with a large overhead, it is possible to estimate an amplitude and phase change different for each subcarrier caused by the IQ imbalance in the receiving side, estimate mutual interference quantity between subcarriers positioned symmetric with respect to a center frequency, and compensate the IQ imbalance based on the estimation result.

First Embodiment

Figure 1:
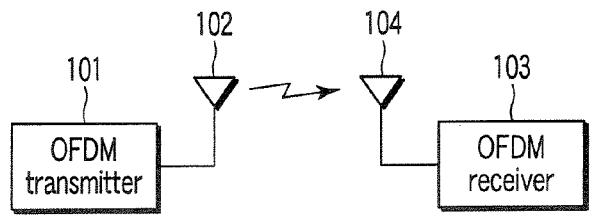
FIG. 1 is a schematic view of an OFDM communication system according to an embodiment.

As illustrated in FIG. 1, in an OFDM wireless communication system according to a first embodiment of the present invention, an OFDM signal is transmitted from an OFDM transmitter 101 having a transmitting antenna 102. The transmitted OFDM signal is received by an OFDM receiver 103 having a receiving antenna 104. Here, the OFDM transmitter 101 and OFDM receiver 103 are described as having one antenna each. However, the OFDM transmitter may have a plurality of transmitting antennas and the OFDM receiver may have a plurality of receiving antennas.

Figure 2:
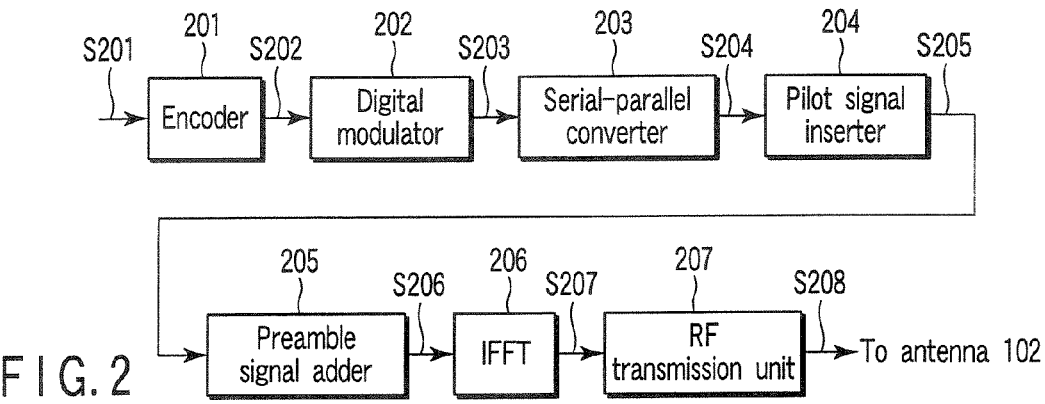
FIG. 2 is a block diagram showing an OFDM transmitter according to an embodiment.

The structure of the OFDM transmitter 101 illustrated in FIG. 1 will be explained using FIG. 2. The OFDM transmitter 101 comprises an encoder 201, a digital modulator 202, a serial-to-parallel converter 203, a pilot signal inserter 204, a preamble signal adder 205, an IFFT (inverse fast Fourier transition) unit 206 and an RF transmission unit 207.

The input transmitting data S201 is coded by the encoder 201. The coded data S202 is subject to digital modulation by the digital modulator 202, such as by binary phase shift keying (BPSK), quadrature phase shift keying (QPSK), 16 quadrature amplitude modulation (16QAM) and 64QAM. The modulated data signal S203 output from the digital modulator 202 is allocated to a subcarrier (data subcarrier) for transmitting data signals, by the serial-parallel converter 203.

The modulated data S204 allocated to the data subcarrier by the serial-to-parallel converter 203 is input to the pilot signal inserter 204. The pilot signal inserter 204 inserts a pilot signal into the modulated data S204. The pilot signal is a known signal for residual phase offset estimation, which is allocated to a subcarrier (pilot subcarrier) positioned between the data subcarriers. In other words, the pilot signal inserter 204 functions as a pilot signal to subcarrier allocation unit for allocating the pilot signal to the pilot subcarrier.

The output signal S205 from the pilot signal inserter 204 is input to the preamble signal adder 205. The preamble signal adder 205 adds a channel estimation preamble signal which is a known signal for channel estimation before the signal S205. In other words, the preamble signal adder 205 functions as a channel estimation preamble signal to subcarrier allocation unit, which allocates the channel estimation preamble signal to a subcarrier (channel estimation subcarrier). The channel estimation hereby refers to estimating the impulse response of a channel (propagation path) (referred to as a channel response) between the transmitting side (the OFDM transmitter 101, in the present case) and the receiving side (the OFDM receiver 103, in the present case) as is well known.

The signal S206 output from the preamble signal adder 205 is subject to an inverse fast Fourier transform by the IFFT unit 206. As a result of inverse fast Fourier transform, the frequency domain signal S206 is converted into a time domain OFDM signal S207 and is input to the RF transmission unit 207. In the RF transmission unit 207, the time domain OFDM signal S207 is converted into an analog signal, which is then further converted into radio frequency and transmitted through the transmit antenna 102. Detailed explanations of the RF transmission unit 207 will be omitted, as it has a general configuration, including, such as a digital-analog converter, a quadrature modulator, a filter or a power amplifier.

Figure 3:
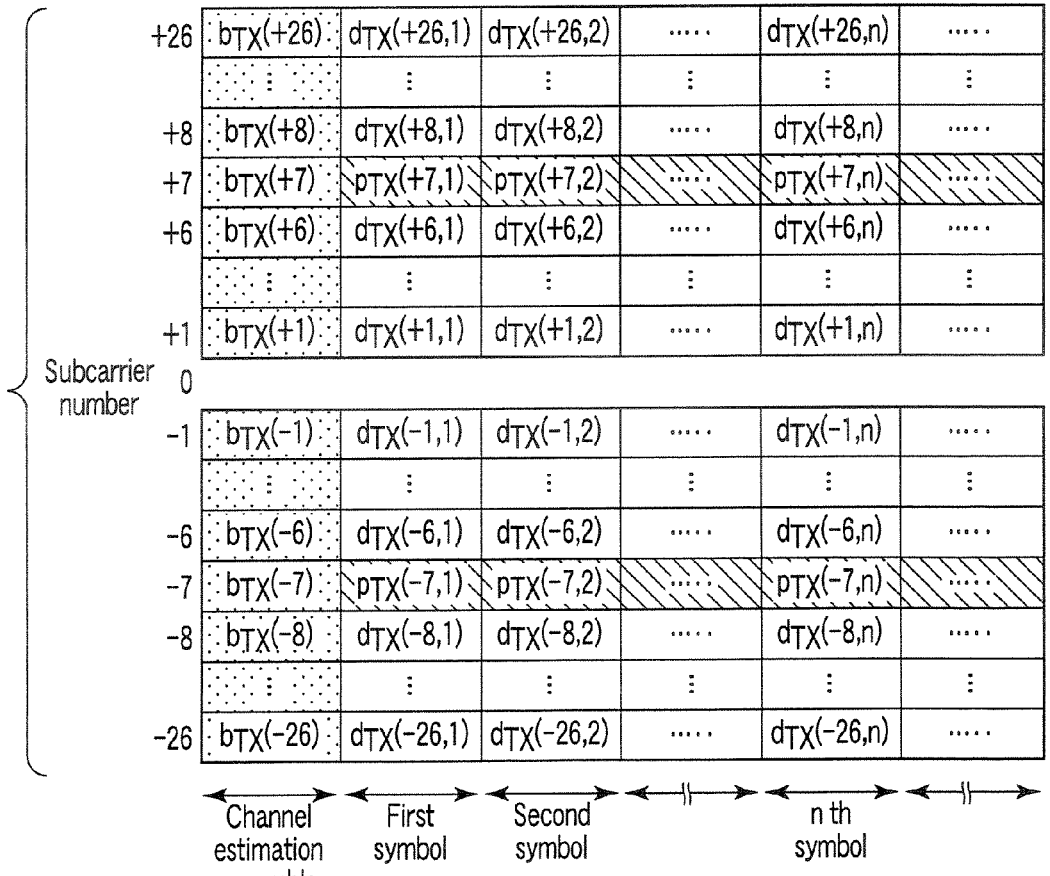
FIG. 3 illustrates a subcarrier arrangement of an OFDM signal transmitted according to an embodiment.

Now, the frame structure of the OFDM signal transmitted by the OFDM transmitter 101 will be explained in detail, particularly, with regard to the structures of the channel estimation preamble signal and the pilot signal, using FIG. 3. In FIG. 3, the horizontal axis and the vertical axis respectively represent the time and frequency (subcarrier numbers).

The modulated data S204 allocated to the data subcarrier is input to the pilot signal inserter 204. The pilot signal inserter 204 inserts a known signal referred to as the pilot signal which is transmitted by the subcarrier (pilot subcarrier) positioned between the data subcarriers. In other words, the pilot signal inserter 204 allocates the pilot signal to the pilot subcarrier. Here, to "allocate the data signal or the pilot signal to a subcarrier" means to add a subcarrier index to the data signal or the pilot signal. The subcarrier index represents the position of the subcarrier on time axis and the frequency axis to which the data signal or the pilot signal should be allocated. Meanwhile, in distinction from the pilot signal within the OFDM signal received by the OFDM receiver described latter, the pilot signal transmitted from the OFDM transmitter will be referred to as transmitting pilot signal.

The output signal (the pilot signal and the data signal respectively allocated to the pilot subcarrier and the data subcarrier) S205 from the pilot signal inserter 204 is input to the preamble signal adder 205. The preamble signal adder 205 adds a known signal for channel estimation referred to as a channel estimation preamble before the signal S205.

The signal S206 output from the preamble signal adder 205 is input to the inverse fast Fourier transform (IFFT) unit 206. As a result of inverse fast Fourier transform by the IFFT unit 206, the signal S206 is converted into the OFDM signal S207 on the time axis. The OFDM signal S207 is input to the RF transmission unit 207. The RF transmission unit 207 converts the OFDM signal S207 into an analogue signal, then, further into a wireless frequency band signal by frequency conversion and generates a transmitting OFDM signal. The transmitting OFDM signal is transmitted by the transmit antenna 102. Detailed explanations of the RF transmission unit 207 will be omitted, as it has a general configuration, including, such as a digital-analog converter, a quadrature modulator, a filter and a power amplifier.

The frame structure of the transmitting OFDM signal generated in the OFDM transmitter 101 will be explained in detail, particularly, with regard to the structure of the transmitting pilot signal, using FIG. 3.

The OFDM transmitter 101 transmits a channel estimation preamble signal $b_{Tx}(k)$ prior to transmitting the data signal. $b_{Tx}(k)$ represents a signal value of a channel estimation preamble allocated to the kth subcarrier. After the channel estimation preamble signal is transmitted, the transmitting pilot signal $p_{Tx}(k,n)$ is transmitted simultaneously with the data signal $d_{Tx}(k,n)$. Here, $d_{Tx}(k,n)$ and $p_{Tx}(k,n)$ respectively represent the data signal value and the transmitting pilot signal value transmitted in the nth symbol of the kth subcarrier. The channel estimation preamble signal $b_{Tx}(k,n)$ and the transmitting pilot signal $p_{Tx}(k,n)$ are known signals in the OFDM receiver 103.

The transmitting pilot signal $\{p_{Tx}(+7,n_1), pTx(-7, n_1)\}$ allocated to the $+7^{th}$ and $-7^{th}$ subcarriers, which is to be transmitted in the $n_{1st}$ symbol (by the $1^{st}$ OFDM symbol), and the transmitting pilot signal $\{p_{Tx}(+7, n_2), pTx(-7, n_2)\}$ allocated to the $+7^{th}$ and $-7^{th}$ subcarriers, which is to be transmitted in the $n_{2nd}$ symbol (by the $2^{nd}$ OFDM symbol), satisfy the condition of the following equation.

$$p_{Tx}(+7, n_1)p_{Tx}{}^*(-7, n_2)-p_{Tx}(+7, n_2)p_{Tx}{}^*(-7, n_1) \neq 0 \quad (1\text{-}1)$$

Further, preferably, $\{p_{Tx}(+7, n_1), p_{Tx}(-7, n_1)\}$ and $\{p_{Tx}(+7, n_2), pTx(-7, n_2)\}$ satisfy the condition of the following equation.

$$p_{Tx}(+7, n_1)p_{Tx}(+7, n_2)+p_{Tx}{}^*(-7, n_1)p_{Tx}{}^*(-7, n_2)=0 \quad (2\text{-}1)$$

In the case where the transmitting pilot signal satisfies the condition of the above equation, the estimation accuracy of the IQ imbalance under a noise environment improves, thereby bringing about an advantage of improving the compensation accuracy of the IQ imbalance.

The $n_{1st}$ and $n_{2nd}$ symbols (the first OFDM symbol and the second OFDM symbol) including transmitting pilot signals satisfying equation (1-1) are described as the $1^{st}$ symbol and $2^{nd}$ symbol. However, as this is only an example, the transmitting pilot signal which satisfies equation (1-1) may be included in any two symbols (for example, a $3^{rd}$ symbol and a $7^{th}$ symbol, a channel estimation preamble and a $4^{th}$ symbol).

For example, the following equations (3), (4) and (5) can be cited as the combinations of $p_{Tx}(+7, 1)$, $p_{Tx}(-7, 1)$, $p_{Tx}(+7, 2)$ and $p_{Tx}(-7, 2)$ which satisfy the two conditions shown in equations (1-1) and (2-1) simultaneously.

$$\{p_{Tx}(+7,1), p_{Tx}(-7,1)\} = \{1, 1\}$$

$$\{p_{Tx}(+7,2), p_{Tx}(-7,2)\} = \{1, -1\} \quad (3)$$

$$\{p_{Tx}(+7,1), p_{Tx}(-7,1)\} = \{1, 1\}$$

$$\{p_{Tx}(+7,2), p_{Tx}(-7,2)\} = \{j, j\} \quad (4)$$

$$\{p_{Tx}(+7,1), p_{Tx}(-7,1)\} = \{1-j, 1+j\}$$

$$\{p_{Tx}(+7,2), p_{Tx}(-7,2)\} = \{1+j, -1+j\} \quad (5)$$

where j represents imaginary units. The transmitting pilot signals are not restricted to the combination of equations (3), (4) and (5), and it is possible to use any pilot signal satisfying equation (1-1) and, preferably, equation (2-1).

The subcarrier number used for the transmitting pilot signal is $k=\pm 7$. However, this is not restricted. As long as a pair of subcarriers positioned symmetric with respect to the $0^{th}$ subcarrier, i.e., the center frequency, (that is, the +Kth subcarrier and the −Kth subcarrier) is used for the transmitting pilot signal, it is possible to use any subcarrier for the transmitting pilot signal. In such case, equation (1-1) and equation (2-1) are respectively generalized as follows:

$$p_{Tx}(+K, n_1)p_{Tx}^*(-K, n_2) - p_{Tx}(+K, n_2)p_{Tx}^*(-K, n_1) \neq 0 \quad (1-2)$$

$$p_{Tx}(+K, n_1)p_{Tx}(+K, n_2) + p_{Tx}^*(-K, n_1)p_{Tx}(-K, n_2) = 0 \quad (2-2)$$

In other words, equation (1-2) expresses that the difference between the product of the transmitting pilot signal pTx(+K, $n_1$) and the complex conjugate pTx*(−K, $n_2$) of the transmitting pilot signal pTx(−K, $n_2$) and the product of the transmitting pilot signal pTx(+K, $n_2$) and the complex conjugate pTx*(−K, $n_1$) of the transmitting pilot signal pTx(−K, $n_1$) is non-zero.

Meanwhile, equation (2-2) expresses that the sum of the product of the transmitting pilot signals pTx(+K, $n_1$) and pTx(+K, $n_2$) and the product of the complex conjugate pTx*(−K, $n_1$) of the transmitting pilot signal pTx(−K, $n_1$) and the complex conjugate pTx*(−K, $n_2$) of the transmitting pilot signal pTx(−K, $n_2$) is zero.

By setting the transmitting pilot signals $p_{Tx}(+7, 1)$, $p_{Tx}(-7, 1)$, $p_{Tx}(+7, 2)$ and $p_{Tx}(-7, 2)$, or pTx(+K, $n_1$), pTx(−K, $n_1$), pTx(+K, $n_2$) and pTx(−K, $n_2$) as above, it is possible to estimate the amplitude and phase change caused by the IQ imbalance and the mutual interference quantity between subcarriers positioned symmetrical with respect to the center frequency at the receiving side as will be explained later. The IQ imbalance compensation will be easily performed using estimated parameters. In this case, the transmitting OFDM signal can take the frame structure of FIG. 3, which does not require a particular preamble signal, thereby having the advantage of not accompanying an increase in the overhead due to the preamble signal.

The OFDM receiver 103 in FIG. 1 will be explained using FIG. 4. The OFDM receiver 103 comprises an RF reception unit 401 including a quadrature demodulator, an FFT (fast Fourier transform) unit 402, an IQ imbalance compensator 403, a distortion coefficient estimator 404, a compensation weight calculating unit 405, a channel estimator 406, a channel equalizer 407 and a decoder 408. The RF reception unit 401 converts the OFDM signal S401 received by the receiving antenna 104 into a baseband by frequency conversion, then into a digital signal S402.

FIG. 5 shows a simplified model of the RF reception unit 401. In the RF reception unit 401, when performing frequency conversion, multipliers 501 and 502 constituting the quadrature demodulator multiply the received signal S401 by two local signals S501 and S502 ideally possessing a phase difference of $-\pi/2$, in order to separate an inphase component signal and an orthogonal component signal. The local signal S501 is generated by an oscillator 503, and the local signal S502 is generated by a phase shifter 504 shifting the phase of the local signal S501 by $-\pi/2$. The output signals from the multipliers 501 and 502 are output through output units 505 and 506 which include, such as, a filter, a variable gain amplifier and an analogue-digital converter. The output signals from output units 505 and 506 are equivalent to a digital signal S402 output from the RF reception unit 401.

When the RF reception unit 401 as shown in FIG. 5 consists of an analogue circuit, it is difficult to obtain an accurate phase difference of $-\pi/2$ between the local signals S501 and S502. In other words, in practice, the phase error shown as $\phi$IQ within the block of the phase shifter 504 in FIG. 5 occurs in the above phase difference. Similarly, as for the amplitude of the local signals S501 and S502, an amplitude error shown as $g_{IQ}$ in FIG. 5 occurs between the local signals S501 and S502 due to characteristic difference of the output units 505 and 506 or, for example, the analogue-to-digital converter. Such phase error and amplitude error are collectively referred to as IQ imbalance.

Time domain signals (the output signals from the output units 505 and 506 in the example of FIG. 5) of the inphase component and the orthogonal component extracted in the case where the IQ imbalance occurs are respectively described as $y_I(t)$ and $y_Q(t)$. Meanwhile, time domain signals of the inphase component and the orthogonal component extracted under an ideal environment without the occurrence of the IQ imbalance are respectively described as $x_I(t)$ and $x_Q(t)$. Further, time domain signals of a noise to be added to the inphase component and the orthogonal component are respectively described as $n_I(t)$ and $n_Q(t)$. In such case, vector $Y(t) = [y_I(t), y_Q(t)]^T$ possessing components $y_I(t)$, $y_Q(t)$ can be described in the following equation by using vector $X(t) = [x_I(t), x_Q(t)]^T$ possessing components $x_I(t)$, $x_Q(t)$ and vector $N(t) = [n_I(t), n_Q(t)]^T$ possessing components $n_I(t)$, $n_Q(t)$.

$$Y(t) = Q_{time} X(t) + N(t) \quad (6)$$

$Q_{time}$ is a matrix representing the influence of the IQ imbalance on a time domain signal, which can be expressed by the following equation using the amplitude error $g_{IQ}$ and the phase error $\phi_{IQ}$ of the IQ imbalance.

$$Q_{time} = \begin{bmatrix} 1 & 0 \\ -g_{IQ}\sin\phi_{IQ} & g_{IQ}\cos\phi_{IQ} \end{bmatrix} \quad (7)$$

The digital signal S402 output from the RF reception unit 401 is input to the FFT unit 402, where it is subject to fast Fourier transform and divided into signals S403 for each subcarrier. Here, among the signals S403 for each subcarrier in a certain symbol, the signal corresponding to the kth subcarrier is described as $s_{Rx}(k)$. In addition, for simplicity, it is assumed that there is no time jitter of a channel response and IQ imbalance within a frame. In the case where the IQ imbalance occurs in the RF reception unit 401, $s_{Rx}(k)$ can be expressed by the following equation.

$$s_{Rx}(k)=\alpha(k)s_{Tx}(k)+\beta(k)s_{Tx}^*(-k)+m(k) \quad (8)$$

where $s_{Tx}(k)$ represents a signal transmitted by the kth subcarrier, $m(k)$ represents a noise signal to be added in the kth subcarrier, and * represents a complex conjugate calculation. $\alpha(k)$ and $\beta(k)$ are coefficients (hereinafter, referred to as distortion coefficients) both given uniquely by the channel response characteristics and the IQ imbalance (amplitude error and phase error) which occurs in the RF reception unit 401. They are respectively described as follows.

$$\alpha(k) = \frac{1}{2}h(k)(1+\gamma_{IQ}^*) \quad (9)$$

$$\beta(k) = \frac{1}{2}h^*(-k)(1-\gamma_{IQ}) \quad (10)$$

where $h(k)$ is a channel response corresponding to the kth subcarrier, and $\gamma_{IQ}$ is the IQ imbalance characteristic given by $\gamma_{IQ}=g_{IQ}\exp(j\phi_{IQ})$ ($g_{IQ}$: amplitude error, $\phi_{IQ}$: phase error).

From equation (8), when the IQ imbalance occurs, it is understood that the signal received by the +kth subcarrier includes an interference component $\beta(k)s^*_{Tx}(-k)$ from a signal transmitted by the -kth subcarrier. The above interference given to a certain subcarrier by another subcarrier positioned symmetric from said subcarrier with respect to a center frequency on the frequency axis causes a problem by deteriorating the reception quality. In the first embodiment, the reception quality is improved by removing the interference component $\beta(k)s^*_{Tx}(-k)$ that occurs due to such IQ imbalance as follows.

Vector $S_{Rx}(k)=[s_{Rx}(k) s^*_{Rx}(-k)]^T$ possessing components $s_{Rx}(k)$ and $s^*_{Rx}(-k)$ and vector $S_{Tx}(k)=[s_{Tx}(k) s^*_{Tx}(-k)]^T$ possessing components $s_{Tx}(k)$ and $s^*_{Tx}(-k)$ are defined. $S_{Rx}(k)$ can be given by the following equations (8) to (10).

$$S_{Rx}(k)=Q_{freq}H(k)S_{Tx}(k)+M(k) \quad (11)$$

Here, $Q_{freq}$ is a matrix representing the influence of the IQ imbalance on the signal for each subcarrier, $H(k)$ is a matrix of the channel response characteristic, and $M(k)$ is a noise signal vector, which can be described in the following equations, respectively.

$$Q_{freq} = \frac{1}{2}\begin{bmatrix} 1+\gamma_{IQ}^* & 1-\gamma_{IQ} \\ 1-\gamma_{IQ}^* & 1+\gamma_{IQ} \end{bmatrix} \quad (12)$$

$$H(k) = \begin{bmatrix} h(k) & 0 \\ 0 & h^*(-k) \end{bmatrix} \quad (13)$$

$$M(k) = \begin{bmatrix} m(k) \\ m^*(-k) \end{bmatrix} \quad (14)$$

Among the output signals S403 from the FFT unit 402, signals corresponding to the channel estimation preamble signal and signals corresponding to the data signal are input to the IQ imbalance compensator 403. Among the output signals S403 from the FFT unit 402, a receiving pilot signal corresponding to a transmitting pilot signal is further input to the distortion coefficient estimator 404. The distortion coefficient estimator 404 estimates a distortion coefficient with respect to the ±7$^{th}$ subcarrier corresponding to the receiving pilot signal, from the input receiving pilot signals in the 1$^{st}$ symbol zone and the 2$^{nd}$ symbol zone.

Information S404 which indicates the distortion coefficient estimated by the distortion coefficient estimator 404 is given to the compensation weight calculating unit 405. In the compensation weight calculating unit 405, a weight to compensate the influence of the IQ imbalance is calculated from the given distortion coefficient, and a signal S405 indicating said weight is given to the IQ imbalance compensation compensator 403. According to the calculated weight, the IQ imbalance compensator 403 performs a process to compensate the influence of the IQ imbalance for the channel estimation preamble signal and the data signal input from the FFT unit 402. The IQ imbalance compensator 403 supplies the channel estimation preamble signal S406 and data signal S407 having been compensated the influence of the IQ imbalance respectively to the channel estimator 406 and the channel equalizer 407.

The channel estimator 406 estimates channel response by using the channel estimation preamble signal S406 and inputs signal S408 indicating the estimated channel response to the channel equalizer 407. The channel equalizer 407 equalizes the data signal S407 in accordance with the estimated channel response to remove channel distortion and outputs the equalized data signal S409. The decoder 408 decodes the equalized data signal S409 and outputs playback data S410 of the transmitting data.

Processing of the distortion coefficient estimator 404, the compensation weight calculating unit 405 and the IQ imbalance compensator 403 will be explained in detail as follows.

Firstly, the processing of the distortion coefficient estimator 404 will be explained. To start with, the distortion coefficient estimator 404 receives a receiving pilot signal of the 1$^{st}$ symbol zone and the 2$^{nd}$ symbol zone from the FFT unit 402. The receiving pilot signal of the nth symbol zone of the kth subcarrier is described as $p_{Rx}(k, n)$. A noise signal added to the nth symbol of the kth subcarrier is described as $m(k,n)$. In such case, the receiving pilot signals $p_{Rx}(+7, 1)$ and $p_{Rx}(+7, 2)$ of the 1$^{st}$ and 2$^{nd}$ symbol zones of the +7$^{th}$ subcarrier can be expressed by equation (8) as follows.

$$p_{Rx}(+7,1)=\alpha(+7)p_{Tx}(+7,1)+\beta(+7)p_{Tx}^*(-7,1)+m(+7,1) \quad (15)$$

$$p_{Rx}(+7,2)=\alpha(+7)p_{Tx}(+7,2)+\beta(+7)p_{Tx}^*(-7,2)+m(+7,2) \quad (16)$$

Similarly, the receiving pilot signals $p_{Rx}(-7, 1)$ and $p_{Rx}(-7, 2)$ of the 1$^{st}$ and 2$^{nd}$ symbol zones of the -7$^{th}$ subcarrier can be represented as follows.

$$p_{Rx}(-7,1)=\alpha(-7)p_{Tx}(-7,1)+\beta(-7)p_{Tx}^*(+7,1)+m(-7,1) \quad (17)$$

$$p_{Rx}(-7,2)=\alpha(-7)p_{Tx}(-7,2)+\beta(-7)p_{Tx}^*(+7,2)+m(-7,2) \quad (18)$$

In other words, as receiving pilot signals $p_{Rx}(+7, 1)$ and $p_{Rx}(+7, 2)$ can be obtained over two symbol zones in the +7$^{th}$ subcarrier, it is possible to set up a simultaneous equation with respect to $\alpha(+7)$ and $\beta(+7)$ as in equations (15) and (16). Similarly, as receiving pilot signals $p_{Rx}(-7, 1)$ and $p_{Rx}(-7, 2)$ can also be obtained over two symbol zones in the -7$^{th}$ subcarrier, it is possible to set up a simultaneous equation with respect to $\alpha(-7)$ and $\beta(-7)$ as in equations (17) and (18).

With that, from the values of the receiving pilot signals $p_{Rx}(+7, 1)$, $p_{Rx}(-7, 1)$, $p_{Rx}(+7, 2)$ and $p_{Rx}(-7, 2)$ and the known transmitting pilot signals $p_{Tx}(+7, 1)$, $p_{Tx}(-7, 1)$, $p_{Tx}(+7, 2)$ and $p_{Tx}(-7, 2)$, the distortion coefficient estimator 404 subsequently estimates the distortion coefficients $\alpha(+7)$ and $\beta(-7)$ concerning the k=±7$^{th}$ subcarrier, to which the transmitting pilot signal is allocated. Here, the coefficient $\alpha(+7)$ represents the amplitude and phase change component which occurs in the $k=\pm7^{th}$ subcarrier. $\beta(-7)$ represents the interference component given to the $k=-7^{th}$ subcarrier by the $k=+7^{th}$ subcarrier. When describing the estimation values of the distortion coefficients $\alpha(+7)$ and $\beta(-7)$ as $\alpha_{Est}(+7)$, $\beta_{Est}(-7)$ respectively, the distortion coefficient estimator 404 calculates $\alpha_{Est}(+7)$, $\beta_{Est}(-7)$ by the calculation of the following equation.

$$\alpha_{Est}(+7) = \frac{p_{Tx}^*(-7,2)p_{Rx}(+7,1) - p_{Tx}^*(-7,1)p_{Rx}(+7,2)}{p_{Tx}(+7,1)p_{Tx}^*(-7,2) - p_{Tx}(+7,2)p_{Tx}^*(-7,1)} \quad (19\text{-}1)$$

$$\beta_{Est}(-7) = \frac{-p_{Tx}(-7,2)p_{Rx}(-7,1) + p_{Tx}(-7,1)p_{Rx}(-7,2)}{p_{Tx}(-7,1)p_{Tx}^*(+7,2) - p_{Tx}(-7,2)p_{Tx}^*(+7,1)} \quad (20\text{-}1)$$

As the transmitting pilot signals $p_{Tx}(+7, 1)$, $p_{Tx}(-7, 1)$, $p_{Tx}(+7, 2)$ and $p_{Tx}(-7, 2)$ satisfy equation (1-1), it is possible to calculate the distortion coefficients $\alpha_{Est}(+7)$, $\beta_{Est}(-7)$ by the calculations of equations (19-1) and (20-1). In addition, in the case of ignoring the term of thermal noise (m(k, n)=0), when equations (15) and (16) are substituted into equation (19-1), it is understood that the estimation value of the distortion coefficient $\alpha_{Est}(+7)$ becomes the same value as the actual distortion coefficient $\alpha(+7)$. Similarly, when substituting equations (17) and (18) into equation (20-1), it is understood that the estimation value of the distortion coefficient $\beta_{Est}(-7)$ becomes the same value as the actual distortion coefficient $\beta(-7)$.

If the transmitting pilot signals $p_{Tx}(+7, 1)$, $p_{Tx}(-7, 1)$, $p_{Tx}(+7, 2)$ and $p_{Tx}(-7, 2)$ further satisfy equation (2-1) estimation accuracy of the distortion coefficients $\alpha_{Est}(+7)$, $\beta_{Est}(-7)$ in a thermal noise environment improves in comparison to the case of not satisfying the equation (2-1). The distortion coefficient estimator 404 supplies the signal S404 indicating $\alpha_{Est}(+7)$ and $\beta_{Est}(-7)$ estimated by the calculation of equations (19-1) and (20-1) to the compensation weight calculating unit 405.

Here, when generalizing equations (19-1) and (20-1) so as to correspond to equations (1-2) and (2-2), it can be described as follows.

$$\alpha_{Est}(+K) = \frac{p_{Tx}^*(-K,n_2)p_{Rx}(+K,n_1) - p_{Tx}^*(-K,n_1)p_{Rx}(+K,n_2)}{p_{Tx}(+K,n_1)p_{Tx}^*(-K,n_2) - p_{Tx}(+K,n_2)p_{Tx}^*(-K,n_1)} \quad (19\text{-}2)$$

$$\beta_{Est}(-K) = \frac{-p_{Tx}(-K,n_2)p_{Rx}(-K,n_1) + p_{Tx}(-K,n_1)p_{Rx}(-K,n_2)}{p_{Tx}(-K,n_1)p_{Tx}^*(+K,n_2) - p_{Tx}(-K,n_2)p_{Tx}^*(+K,n_1)} \quad (20\text{-}2)$$

The processing carried out by the compensation weight calculating unit 405 will be explained. The compensation weight calculating unit 405 receives the output signal S404 from the distortion coefficient and, from the estimated distortion coefficients $\alpha_{Est}(+7)$ and $\beta_{Est}(-7)$, calculates the division result w described in the following equation.

$$w = \frac{\beta_{Est}(-7)}{\alpha_{Est}^*(+7)} \quad (21\text{-}1)$$

Here, when using K to generalize equation (21-1) so as to correspond to equations (19-2) and (20-2), the equation is as follows.

$$w = \frac{\beta_{Est}(-K)}{\alpha_{Est}^*(+K)} \quad (21\text{-}2)$$

In the case of ignoring the term of thermal noise (m(k, n)=0), $\alpha_{Est}(+7)=\alpha(+7)$, $\beta_{Est}(-7)=\beta(-7)$ are realized. Therefore, the division result w of equation (21-1) can be described as follows by the equations (9) and (10).

$$w = \frac{\beta(-7)}{\alpha^*(+7)} \quad (22\text{-}1)$$

$$= \frac{\frac{1}{2}h^*(+7)(1-\gamma_{IQ})}{\frac{1}{2}h^*(+7)(1+\gamma_{IQ})}$$

$$= \frac{1-\gamma_{IQ}}{1+\gamma_{IQ}}$$

The compensation weight calculating unit 405 supplies the IQ imbalance compensator 403 with the calculated division result w as the weight for IQ imbalance compensation (S405).

The processing of the IQ imbalance compensator 403 will be explained. The IQ imbalance compensator 403 receives the receiving channel estimation preamble signal and receiving data signal, which are output sequentially from the FFT unit 402. The channel estimation preamble signal in the kth subcarrier input from the FFT unit 402 is described as $b_{Rx}(k)$. The data signal of the nth symbol in the kth subcarrier input from the FFT unit 402 is described as $d_{Rx}(k, n)$. $b_{Rx}(k)$ and $d_{Rx}(k, n)$ are given respectively in the following equations by equation (8).

$$b_{Rx}(k)=\alpha(k)b_{Tx}(k)+\beta(k)b_{Tx}^*(-k)+m_b(k)$$
$$(k=\pm1,\pm2,\ldots) \quad (23)$$

$$d_{Rx}(k,n)=\alpha(k)d_{Tx}(k,n)+\beta(k)d_{Tx}^*(-k,n)+m(k,n)$$
$$(k=\pm1,\pm2,\ldots,k\neq\pm7, n=1,2,\ldots) \quad (24)$$

where $m_b(k)$ is a noise signal added to the receiving channel estimation preamble signal which is on the kth subcarrier.

When the output signal S405 indicating the weight w is input from the compensation weight calculating unit 405, the IQ imbalance compensator 403 performs compensation for the receiving channel estimation preamble signal $b_{Rx}(k)$ and the receiving data signal $d_{Rx}(k, n)$ to remove the influence of the IQ imbalance. More specifically, the compensation is performed on the kth subcarrier in order to remove the interference component ($\beta(k)b^*_{Tx}(k)$ and $\beta(k)d^*_{Tx}(-k, n)$ of equations (23) and (24)) given from the $-$kth subcarrier which is symmetrical with respect to the center frequency on the frequency axis. When describing the compensated receiving channel estimation preamble signal and compensated receiving data signal as $b_{Eq}(k)$ and $d_{Eq}(k, n)$ respectively, the IQ imbalance compensator 403 compensates the receiving channel estimation preamble signal $b_{Rx}(k)$ and the receiving data signal $d_{Rx}(k, n)$ by the calculation of the following equations.

$$b_{Eq}(k)=b_{Rx}(k)-wb_{Rx}^*(-k) \; (k=\pm1,\pm2,\ldots) \quad (25)$$

$$d_{Eq}(k,n)=d_{Rx}(k,n)-wd_{Rx}^*(-k,n) \; (k=\pm1,\pm2,\ldots, k\neq\pm7, n=1,2,\ldots) \quad (26)$$

In the case of ignoring the term of thermal noise ($m_b(k)=m(k, n)=0$), the preamble signal and data signal undergone IQ imbalance compensation can be described respectively in the following equations from equations (9), (10), (22), (23) and (24). Accordingly, it can be understood that it is possible to remove the interference between the subcarriers positioned symmetric with respect to the center frequency on the frequency axis.

$$b_{Rx}(k) = \alpha(k)b_{Tx}(k) + \beta(k)b_{Tx}^*(-k) + m_b(k)$$

$$(k = \pm1, \pm2, \cdots)$$

$$\begin{aligned}b_{Eq}(k) &= \alpha(k)b_{Tx}(k) + \beta(k)b_{Tx}^*(-k) - \\ & \quad w\{\alpha^*(-k)b_{Tx}^*(-k) + \beta^*(-k)b_{Tx}(k)\} \\ &= \frac{1}{2}h(k)(1+\gamma_{IQ}^*)b_{Tx}(k) + \frac{1}{2}h^*(-k)(1-\gamma_{IQ})b_{Tx}^*(-k) - \\ & \quad \frac{1-\gamma_{IQ}}{1+\gamma_{IQ}}\left\{\frac{1}{2}h^*(-k)(1+\gamma_{IQ})b_{Tx}^*(-k) + \frac{1}{2}h(k)(1-\gamma_{IQ}^*)b_{Tx}(k)\right\} \\ &= \frac{\gamma_{IQ}+\gamma_{IQ}^*}{1+\gamma_{IQ}}h(k)b_{Tx}(k) \\ &= \mu(k)b_{Tx}(k)\end{aligned}$$ (27)

$$(k = \pm1, \pm2, \cdots)$$

$$\begin{aligned}d_{Eq}(k,n) &= \alpha(k)d_{Tx}(k,n) + \beta(k)d_{Tx}^*(-k,n) - \\ & \quad w\{\alpha^*(-k)d_{Tx}^*(-k,n) + \beta^*(-k)d_{Tx}(k,n)\} \\ &= \frac{1}{2}h(k)(1+\gamma_{IQ}^*)d_{Tx}(k,n) + \frac{1}{2}h^*(-k)(1-\gamma_{IQ})d_{Tx}^*(-k,n) - \\ & \quad \frac{1-\gamma_{IQ}}{1+\gamma_{IQ}}\left\{\frac{1}{2}h^*(-k)(1+\gamma_{IQ})d_{Tx}^*(-k,n) + \frac{1}{2}h(k)(1-\gamma_{IQ}^*)d_{Tx}(k,n)\right\} \\ &= \frac{\gamma_{IQ}+\gamma_{IQ}^*}{1+\gamma_{IQ}}h(k)d_{Tx}(k,n) \\ &= \mu(k)d_{Tx}(k,n)\end{aligned}$$ (28)

$$(k = \pm1, \pm2, \cdots, k \neq \pm7, n = 1, 2, \cdots)$$

$\mu(k)=(\gamma_{IQ}+\gamma^*_{IQ})h(k)/(1+\gamma_{IQ})$, which may be considered as the channel response characteristic value for the kth subcarrier from the OFDM transmitter 101 to the IQ imbalance compensator 403. The IQ imbalance compensator 403 supplies the channel estimation preamble signal $b_{Eq}(k)$ (S406) and the data signal $d_{Eq}(k, n)$ (S407), which have been compensated the influence of the IQ imbalance, to the channel estimator 406 and the channel equalizer 407 respectively.

When describing the receiving channel estimation preamble signal $b_{Rx}(k)$ or the receiving data signal $d_{Rx}(k, n)$ by a first transmitting information signal $u_{Tx}(k)$ and a second transmitting information signal $u_{Tx}(-k)$ which are respectively allocated to a third subcarrier and a fourth subcarrier positioned symmetric with respect to a center frequency on a frequency axis in the third OFDM symbol, equation (25) or (26) can be generalized as follows.

$$u_{Rx}(k)-wu_{Rx}^*(-k)$$

where $u_{Rx}(k)$ represents a first receiving information signal corresponding to the first transmitting information signal $u_{Tx}(k)$ within the receiving OFDM signal, and $u_{Rx}(-k)$ represents a second receiving information signal corresponding to the second transmitting information signal $u_{Tx}(-k)$ within the receiving OFDM signal.

In the channel estimator 406, the channel response characteristic $\mu(k)$ is estimated by applying a heretofore known channel estimation method to the channel estimation preamble signal $b_{Eq}(k)$ which has been compensated the influence of the IQ imbalance. The estimation value $\mu_{Est}(k)$ of $\mu(k)$ can be obtained by, for example, the following channel estimation method.

$$\mu_{Est}(k)=b_{Eq}(k)/b_{Tx}(k) \quad (k=\pm1,\pm2,\ldots)$$ (29)

In the case of ignoring the term of thermal noise, equation (27) is established. Therefore, the estimation value $\mu_{Est}(k)$ of the channel response characteristic becomes an identical value with the actual channel response characteristic $\mu(k)$, as described in the following equation.

$$\mu_{Est}(k)=\mu(k)b_{Tx}(k)/b_{Tx}(k)=\mu(k) \quad (k=\pm1,\pm2,\ldots)$$ (30)

The channel estimator 406 supplies the estimated channel response characteristic $\mu_{Est}(k)$ to the channel equalizer 407. The channel equalizer 407 obtains the estimation value $d_{TxEst}(k, n)$ of the transmitting data signal $d_{Tx}(k, n)$ by applying the heretofore known channel equalization method to the data signal $d_{Eq}(k, n)$ being compensated the IQ imbalance influence. $d_{TxEst}(k, n)$ can be obtained by, for example, the following channel equalization method.

$$d_{TxEst}(k,n)=d_{Eq}(k,n)/\mu_{Est}(k) \quad (k=\pm1,\pm2,\ldots,k\neq\pm7, n=1,2,\ldots)$$ (31)

In the case of ignoring the term of thermal noise, equations (28) and (30) are established, therefore, the estimation value $d_{TxEst}(k, n)$ of the transmitting data signal becomes the same value as the actual transmitting data signal $d_{Tx}(k, n)$, as described in the following equation. Therefore, it is understood that the transmitting data signal $d_{Tx}(k, n)$ can be demodulated correctly.

$$d_{Tx}(k,n)=\mu(k)d_{Tx}(k,n)/\mu(k)=d_{Tx}(k,n) \quad (k=\pm1,\pm2,\ldots, k\neq\pm7, n=1,2,\ldots)$$ (32)

As explained above, in the OFDM receiver concerned in the first embodiment, the distortion coefficient regarding the subcarrier to which the transmitting pilot signal is allocated is estimated from the receiving pilot signal, and the influence of the IQ imbalance in the channel estimation preamble signal and data signal is compensated by using the compensation weight calculated from the estimated distortion coefficient. By performing these estimation and compensation processes, the interference component between the subcarriers positioned symmetric with respect to a center frequency occurred due to an IQ imbalance can be removed as shown in equations (23) and (24), and the transmitting data signal can be demodulated with high accuracy.

Second Embodiment

A second embodiment of the present invention will be explained. The OFDM transmitter concerned in the second embodiment is identical with the one shown in FIG. 2 in the first embodiment. Meanwhile, the OFDM receiver concerned in the second embodiment is basically the same as the first embodiment shown in FIG. 4, except that only the operations of the distortion coefficient estimator 404 and the compensation weight calculating unit 405 differ from those of the first embodiment. The operations of the distortion coefficient estimator 404 and the compensation weight calculating unit 405 in the second embodiment will be explained as follows.

Firstly, the processing of the distortion coefficient estimator 404 will be explained. To start with, the distortion coefficient estimator 404 receives the receiving pilot signals of the $1^{st}$ symbol and $2^{nd}$ symbol zones output from the FFT unit 402. Here, the receiving pilot signals $p_{Rx}(+7, 1)$ and $p_{Rx}(+7, 2)$ of the $1^{st}$ and $2^{nd}$ symbol zones in the $+7^{th}$ subcarrier can be described by equations (15) and (16), respectively. Similarly, the receiving pilot signals $p_{Rx}(-7, 1)$ and $p_{Rx}(-7, 2)$ of the $1^{st}$ and $2^{nd}$ symbol zones in the $-7^{th}$ subcarrier can be expressed by equations (17) and (18).

From the received pilot signal and the known transmitting pilot signal value, the distortion coefficient estimator 404 estimates distortion coefficients $\alpha(-7)$ and $\beta(+7)$ with respect to subcarrier $k=\pm 7$ to which the pilot signal is transmitted ($\alpha(+7)$ and $\beta(-7)$ are estimated in the first embodiment). The estimation value of the distortion coefficients $\alpha(-7)$ and $\beta(+7)$ are described as $\alpha_{Est}(-7)$ and $\beta_{Est}(+7)$, respectively. The distortion coefficient estimator 404 calculates $\alpha_{Est}(-7)$ and $\beta_{Est}(+7)$ by the calculation of the following equations.

$$\alpha_{Est}(-7) = \frac{p^*_{Tx}(+7, 2)p_{Rx}(-7, 1) - p^*_{Tx}(+7, 1)p_{Rx}(-7, 2)}{p_{Tx}(-7, 1)p^*_{Tx}(+7, 2) - p_{Tx}(-7, 2)p^*_{Tx}(+7, 1)} \quad (33)$$

$$\beta_{Est}(+7) = \frac{-p_{Tx}(+7, 2)p_{Rx}(+7, 1) + p_{Tx}(+7, 1)p_{Rx}(+7, 2)}{p_{Tx}(+7, 1)p^*_{Tx}(-7, 2) - p_{Tx}(+7, 2)p^*_{Tx}(-7, 1)} \quad (34)$$

In the second embodiment, as the transmitting pilot signal satisfies equation (1-1), it is possible to calculate the distortion coefficients $\alpha_{Est}(-7)$ and $\beta_{Est}(+7)$ by the calculations of equations (33) and (34). In the case of ignoring the term of thermal noise (m(k, n)=0), when substituting equations (17) and (18) into equation (33), it is understood that the estimation value $\alpha_{Est}(-7)$ of the distortion coefficient becomes identical with the actual distortion coefficient $\alpha(-7)$. Similarly, when substituting equations (15) and (16) into equation (34), it is understood that the estimation value $\beta_{Est}(+7)$ of the distortion coefficient becomes an identical value with the actual distortion coefficient $\beta(+7)$.

Meanwhile, in the case where the transmitted pilot signal further satisfies equation (2-1), the estimation accuracy (the accuracy of $\alpha_{Est}(-7)$ and $\beta_{Est}(+7)$) of the distortion coefficient in a thermal noise environment improves in comparison to the case of not satisfying equation (2-1). The signal S404 indicating the estimation values $\alpha_{Est}(-7)$ and $\beta_{Est}(+7)$ obtained by the calculation of equations (33) and (34) is output from the distortion coefficient estimator 404 and given to the compensation weight calculating unit 405.

The processing of the compensation weight calculating unit 405 will be explained. The compensation weight calculating unit 405 calculates the division result w expressed by the following equation from the distortion coefficient S404 estimated in the distortion coefficient estimator 404.

$$w = \frac{\beta_{Est}(+7)}{\alpha^*_{Est}(-7)} \quad (35)$$

In the case of ignoring the term of thermal noise (m(k, n)=0), $\alpha_{Est}(-7)=\alpha(-7)$ and $\beta_{Est}(+7)=\beta(+7)$ are realized, and the division result w of equation (35) can be described in the following equation.

$$w = \frac{\beta(+7)}{\alpha^*(-7)} \quad (36)$$

$$= \frac{\frac{1}{2}h^*(-7)(1-\gamma_{IQ})}{\frac{1}{2}h^*(-7)(1+\gamma_{IQ})}$$

$$= \frac{1-\gamma_{IQ}}{1+\gamma_{IQ}}$$

The compensation weight calculating unit 405 considers the calculated division result w as the weight for IQ imbalance compensation and supplies the IQ imbalance compensator 403 with the output signal S405 indicating the weight thereof. Likewise in the first embodiment, the IQ imbalance compensator 403 compensates the IQ imbalance for the channel estimation preamble signal and data signal by calculating the equations (25) and (26) using the weight w.

Third Embodiment

A third embodiment of the present invention will be explained. The OFDM transmitter concerned in the third embodiment is identical to the one shown in FIG. 2 in the first embodiment. Meanwhile, the OFDM receiver concerned in the third embodiment is basically the same as FIG. 4 shown in the first embodiment, except that only the operations of the distortion coefficient estimator 404 and the compensation weight calculating unit 405 differ from those of the first embodiment. The operations of the distortion coefficient estimator 404 and the compensation weight calculating unit 405 used in the third embodiment will be explained as follows.

Firstly, the processing of the distortion coefficient estimator 404 will be explained. To start with, the distortion coefficient estimator 404 receives the receiving pilot signals of the $1^{st}$ and $2^{nd}$ symbol zones output from the FFT unit 402. Here, the receiving pilot signals $p_{Rx}(+7, 1)$ and $p_{Rx}(+7, 2)$ of the $1^{st}$ and $2^{nd}$ symbol zones in the $+7^{th}$ subcarrier can be described by equations (15) and (16). Similarly, the receiving pilot signals $p_{Rx}(-7, 1)$ and $p_{Rx}(-7, 2)$ of the $1^{st}$ and $2^{nd}$ symbol zones in the $-7^{th}$ subcarrier can be described by equations (17) and (18). To simplify the following explanations, the receiving pilot signal received in the $1^{st}$ and $2^{nd}$ symbol zones of the $k=\pm 7^{th}$ subcarrier by the distortion coefficient estimator 404 is defined by vector $P_{Rx}(k)$ in the following equation.

$$P_{Rx}(k) = \begin{bmatrix} P_{Rx}(k, 1) \\ P_{Rx}(k, 2) \end{bmatrix} \quad (37)$$

$(k = \pm 7)$

In this case, the receiving pilot signal $P_{Rx}(k)$ received in the $1^{st}$ and $2^{nd}$ symbol zones in the $k=\pm7^{th}$ subcarrier by the distortion coefficient estimator 404 can be described as in the following equation by equations (15) to (18).

$$P_{Rx}(k) = P_{Tx}(k)C(k) + M(k) \quad (38)$$

Here, $P_{Tx}(k)$, $C(k)$ and $M(k)$ are respectively a transmitting pilot signal matrix, a distortion coefficient vector and a noise signal vector, which are defined in the following equations.

$$P_{Rx}(k) = \begin{bmatrix} p_{Rx}(k, 1) \\ p_{Rx}(k, 2) \end{bmatrix} \quad (39)$$

$$p_{Tx}(k) = \begin{bmatrix} p_{Tx}(k, 1) & p_{Tx}^*(-k, 1) \\ p_{Tx}(k, 2) & p_{Tx}^*(-k, 2) \end{bmatrix} \quad (40)$$

$$C(k) = \begin{bmatrix} \alpha(k) \\ \beta(k) \end{bmatrix} \quad (41)$$

$$M(k) = \begin{bmatrix} m(k, 1) \\ m(k, 2) \end{bmatrix} \quad (42)$$

The distortion coefficient estimator 404 estimates distortion coefficients $\alpha(k)$ and $\beta(k)$ with respect to subcarrier $k=\pm7$, to which the pilot signal is transmitted, from the received pilot signal $P_{Rx}(k)$ and a known transmitting pilot signal $P_{Rx}(k)$. The estimation value of distortion coefficients $\alpha(k)$ and $\beta(k)$ are respectively described as $\alpha_{Est}(k)$ and $\beta_{Est}(k)$, and the estimation value vector $C_{Est}(k)$ of the distortion coefficient is defined in the following equation.

$$C_{Est}(k) = \begin{bmatrix} \alpha_{Est}(k) \\ \beta_{Est}(k) \end{bmatrix} \quad (43)$$

The distortion coefficient estimator 404 calculates the estimation value vector $C_{Est}(k)$ of the distortion coefficient by the following equation.

$$\begin{aligned} C_{Est}(k) &= P_{Tx}^{-1}(k)P_{Rx}(k) \quad (44) \\ &= \frac{1}{p_{Tx}(k,1)p_{Tx}^*(-k,2) - p_{Tx}(k,2)p_{Tx}^*(-k,1)} \times \\ &\quad \begin{bmatrix} p_{Tx}^*(-k,2) & -p_{Tx}^*(-k,1) \\ -p_{Tx}(k,2) & p_{Tx}(k,1) \end{bmatrix} \begin{bmatrix} p_{Rx}(k,1) \\ p_{Rx}(k,2) \end{bmatrix} \end{aligned}$$

$(k = \pm 7)$

In the third embodiment, as the transmitting pilot signal satisfies equation (1-1), it is possible to estimate the distortion coefficient $C_{Est}(k)$ ($\alpha_{Est}(k)$ and $\beta_{Est}(k)$) by the calculation of the above equation. In the case of ignoring the terms of thermal noise (M(k)=0), when substituting equation (38) into equation (44), it is understood that the estimation value $C_{Est}(k)$ ($\alpha_{Est}(k)$ and $\beta_{Est}(k)$) of the distortion coefficient will have identical values with the actual distortion coefficient C(k)($\alpha$(k) and $\beta$(k)). The distortion coefficient estimator 404 supplies the compensation weight calculating unit 405 with the distortion coefficient $C_{Est}(k)$ ($\alpha_{Est}(k)$ and $\beta_{Est}(k)$) estimated by the calculation of equation (44) (S404).

The processing of compensation weight calculating unit 405 will be explained. From the distortion coefficient S404 estimated in the distortion coefficient estimator, the compensation weight calculating unit 405 calculates the division result w(k) described by the following equation.

$$w(k) = \frac{\beta_{Est}(-k)}{\alpha_{Est}^*(k)} \quad (45)$$

$(k = \pm 7)$

The compensation weight calculating unit 405 calculates the average value $w_{Ave}$ of the division result w(k) calculated with respect to $k=\pm7$ as shown in the following equation.

$$w_{Ave} = \frac{1}{2}\sum_{k=\pm 7} w(k) \quad (46)$$

Further, in the third embodiment, as show in the above equation, the division result w(+7) with respect to k=+7 and the division result w(−7) with respect to k=−7 are averaged with the same weight. However, this is not restricted, therefore, when averaging, it is also fine to multiply w(+7) and w(−7) by different weight coefficients ρ(k) as shown in the following equation.

$$w_{ave} = \frac{1}{\sum_{k=\pm 7} \rho(k)} \sum_{k=\pm 7} \rho(k)w(k), \quad (47)$$

$$\rho(k) = |\alpha_{Est}(k)|$$

The compensation weight calculating unit 405 supplies the IQ imbalance compensator 403 with the calculated average value $w_{Ave}$ of the division result as a weight for IQ imbalance compensation (S405).

Likewise in the first embodiment, by calculating equations (25) and (26) using the average value $w_{Ave}$ of the division result, the IQ imbalance compensator 403 can compensate the influence of the IQ imbalance for the channel estimation preamble signal and the data signal. In addition, in the third embodiment, as shown in equation (46), the weight is estimated by averaging the division result w(+7) with respect to k=+7 and the division result w(−7) with respect to k=−7. Therefore, in comparison to the first embodiment, the estimation accuracy of the weight under a thermal noise environment is improved, thereby improving the compensation accuracy for the IQ imbalance compensator 403. In other words, the weight in the present embodiment represents the influence of an IQ imbalance unit which does not include the influence of a channel response. The influence of the IQ imbalance unit is identical among all subcarriers, therefore, the influence of the IQ imbalance of all subcarriers can be favorably compensated by using this weight.

Fourth Embodiment

A fourth embodiment of the present invention will be explained. The OFDM transmitter concerned in the fourth embodiment is identical to the one in FIG. 2 shown in the first embodiment. Meanwhile, the OFDM receiver concerned in the fourth embodiment is basically the same as FIG. 4 shown in the first embodiment, except that only the operations of the distortion coefficient estimator 404 and the compensation weight calculating unit 405 differ from those of the first embodiment. The operations of the distortion coefficient estimator 404 and the compensation weight calculating unit 405 used in the fourth embodiment will be explained as follows.

Firstly, the processing of the compensation weight calculating unit 405 will be explained. To start with, the compensation weight calculating unit 405 calculates the division result $\lambda(k)$ described by the following equation from the distortion coefficient S404 estimated in the distortion coefficient estimator 404.

$$\lambda(k) = \frac{\beta_{Est}(-k)}{\alpha^*_{Est}(k)} \tag{48}$$

$$(k = \pm 7)$$

Then, the compensation weight calculating unit 405 calculates the average value $\lambda_{Ave}$ of the division result $\lambda(k)$ which is calculated with respect to $k=\pm 7$, as a compensation weight, as shown in the following equation.

$$\lambda_{Ave} = \frac{1}{2} \sum_{k=\pm 7} \lambda(k) \tag{49}$$

Further, in the four embodiment, as show in the above equation, the division result $\lambda(+7)$ with respect to $k=+7$ and the division result $\lambda(-7)$ with respect to $k=-7$ are averaged with the same weight. However, this is not restricted, therefore, when averaging, it is also fine to multiply $\lambda(+7)$ and $\lambda(-7)$ by different weight coefficients $\rho(k)$ as shown in the example of the following equation.

$$\lambda_{Ave} = \frac{1}{\sum_{k=\pm 7} \rho(k)} \sum_{k=\pm 7} \rho(k)\lambda(k), \tag{50}$$

$$\rho(k) = |\alpha_{Est}(k)|$$

In the case of ignoring the term of thermal noise, $\alpha Est(k)$ $\alpha(k)$ and $\beta Est(k)=\beta(k)$ are set up, therefore, $\lambda_{Ave}$ of equation (49) can be described by the following equation.

$$\lambda_{Ave} = \frac{1}{2} \sum_{k=\pm 7} \frac{\beta(-k)}{\alpha^*(k)} \tag{51}$$

$$= \frac{1}{2} \sum_{k=\pm 7} \frac{\frac{1}{2} h^*(k)(1-\gamma_{IQ})}{\frac{1}{2} h^*(k)(1+\gamma_{IQ})}$$

$$= \frac{1-\gamma_{IQ}}{1+\gamma_{IQ}}$$

The compensation weight calculating unit 405 estimates an IQ imbalance characteristic $\gamma_{IQ}$ from the average value $\lambda_{Ave}$ of the calculated division result. When assuming the estimation value of the IQ imbalance characteristic $\gamma_{IQ}$ as $\gamma_{EstIQ}$, the compensation weight calculating unit 405 calculates $\gamma_{EstIQ}$ by the following equation.

$$\gamma_{EstIQ} = \frac{1-\lambda_{Ave}}{1+\lambda_{Ave}} \tag{52}$$

In the case of ignoring the term of thermal noise, equation (51) is realized. Therefore, when substituting equation (51) into equation (52), it is understood that the estimation value $\gamma_{EstIQ}$ of the IQ imbalance characteristic becomes an identical value with the IQ imbalance characteristic $\gamma_{IQ}$.

The compensation weight calculating unit 405 estimates the inverse matrix $Q^{-1}_{Freq}$ of $Q_{Freq}$ shown in equation (12) by using the estimation value $\gamma_{EstIQ}$ of the IQ imbalance characteristic. When describing the estimation value of $Q^{-1}_{Freq}$ as W, the compensation weight calculating unit 405 calculates W by the following equation.

$$w = \left(\frac{1}{2}\begin{bmatrix} 1+\gamma^*_{EstIQ} & 1-\gamma_{EstIQ} \\ 1-\gamma^*_{EstIQ} & 1+\gamma_{EstIQ} \end{bmatrix}\right)^{-1} \tag{53}$$

$$= \frac{1}{\gamma_{EstIQ}+\gamma^*_{EstIQ}}\begin{bmatrix} 1+\gamma_{EstIQ} & -1+\gamma_{EstIQ} \\ -1+\gamma^*_{EstIQ} & 1+\gamma^*_{EstIQ} \end{bmatrix}$$

In the case of ignoring the term of thermal noise, $\gamma_{IQ}=\gamma_{EstIQ}$ is realized, and the estimation value W of $Q^{-1}_{Freq}$ and $Q^{-1}_{Freq}$ become identical values. The compensation weight calculating unit 405 supplies the IQ imbalance compensator 403 with the calculated estimation value W as the weight for IQ imbalance compensation (S405).

The processing of the IQ imbalance compensator 403 will be explained. The IQ imbalance compensator 403 receives the channel estimation preamble signal and data signal, which are output sequentially from the FFT unit 402. The channel estimation preamble signal of the kth subcarrier input from the FFT unit 402 is described as $b_{Rx}(k)$. In addition, the data signal of the nth symbol in the kth subcarrier input from the FFT unit 402 is described as $d_{Rx}(k, n)$. Further, vector $B_{Rx}(k)=[b_{Rx}(k)\ b^*_{Rx}(-k)]^T$ possessing components $b_{Rx}(k)$ and $b^*_{Rx}(-k)$ and vector $D_{Rx}(k, n)=[d_{Rx}(k, n)\ d^*_{Rx}(-k, n)]^T$ possessing components $d_{Rx}(k, n)$ and $d^*_{Rx}(-k, n)$ are defined. In such case, $B_{Rx}(k)$ and $D_{Rx}(k, n)$ can be described respectively as in the following equation by equation (11).

$$B_{Rx}(k)=Q_{freq}h(k)B_{Tx}(k)+M_b(k)\ (k=1,2,\dots) \tag{54}$$

$$D_{Rx}(k, n)=Q_{freq}h(k)D_{Tx}(k, n)+M(k, n)\ (k=1,2,\dots,\ k\neq 7, n=1,2,\dots) \tag{55}$$

Here, $B_{Tx}(k)$, $D_{Tx}(k, n)$, $M_b(k)$ and $M(k, n)$ are vectors obtained respectively by the following equations.

$$B_{Tx}(k) = \begin{bmatrix} b_{Tx}(k) \\ b^*_{Tx}(-k) \end{bmatrix} \tag{56}$$

$$D_{Tx}(k, n) = \begin{bmatrix} d_{Tx}(k, n) \\ d^*_{Tx}(-k, n) \end{bmatrix} \tag{57}$$

$$M_b(k) = \begin{bmatrix} m_b(k) \\ m^*_b(-k) \end{bmatrix} \tag{58}$$

-continued $$M(k, n) = \begin{bmatrix} m(k, n) \\ m^*(-k, n) \end{bmatrix} \quad (59)$$

When the weight W (S405) is input from the compensation weight calculating unit 405, the IQ imbalance compensator 403 performs compensation to remove the influence of the IQ imbalance for the channel estimation preamble signal $B_{Rx}(k)$ and data signal $D_{Rx}(k, n)$. More specifically, compensation is performed to remove the influence of the IQ imbalance $Q_{Freq}$ for the channel estimation preamble signal $B_{Rx}(k)$ and data signal $D_{Rx}(k, n)$. The compensated channel estimation preamble signal is defined as $B_{Eq}(k)=[b_{Eq}(k)\ b^*_{Eq}(-k)]^T$, and the compensated data signal is defined as $D_{Eq}(k, n)=[d_{Eq}(k, n)\ d^*_{Eq}(-k, n)]^T$. T represents dislocation. The IQ imbalance compensator 403 performs compensation for the channel estimation preamble signal and data signal by the calculation of the following equation.

$$B_{Eq}(k)=W B_{Rx}(k)(k=1,2,\ldots) \quad (60)$$

$$D_{Eq}(k, n)=W D_{Rx}(k, n)(k=1,2,\ldots, k\neq 7, n=1,2,\ldots) \quad (61)$$

In the case of ignoring the term of thermal noise ($M_b(k)=M(k, n)=0$), $W=Q^{-1}_{freq}$ is realized. Therefore, it is understood that the compensated channel estimation preamble signal $B_{Eq}(k)$ and data signal $D_{Eq}(k, n)$ can remove the influence of IQ imbalance $Q_{freq}$ as in the following equation.

$$B_{Eq}(k)=Q_{freq}^{-1}\ Q_{freq}\ h(k)B_{Tx}(k)=h\ (k)B_{Tx}(k)\ (k=1, 2,\ldots) \quad (62)$$

$$D_{Eq}(k, n)=Q_{freq}^{-1}\ Q_{freq}\ h(k)\ D_{Tx}(k, n)=h\ (k)\ D_{Tx}(k, n)\ (k=1,2,\ldots, k\neq 7, n=1,2,\ldots) \quad (63)$$

The IQ imbalance compensator 403 converts the channel estimation preamble signal $B_{Eq}(k)=[b_{Eq}(k)\ b^*_{Eq}(-k)]^T$, which has the influence of the IQ imbalance compensated, into $B'_{Eq}(k)=[b_{Eq}(k)\ b_{Eq}(-k)]^T$ and supplies the channel estimator 406 with $B'_{Eq}(k)$. The IQ imbalance compensator 403 further converts the compensated data signal $D_{Eq}(k, n)=[d_{Eq}(k, n)\ d^*_{Eq}(-k, n)]^T$ into $D'_{Eq}(k)=[d_{Eq}(k, n)\ d_{Eq}(-k, n)]^T$, and supplies the channel equalizer 407 with $D_{Eq}(k, n)$.

As explained above, even in the case of arranging the compensation weight calculating unit 404 and IQ imbalance compensator 405 as in the fourth embodiment, the influence of the IQ imbalance can be compensated and the transmitting data can be demodulated with high accuracy.

Fifth Embodiment

A fifth embodiment of the present invention will be explained. The OFDM transmitter concerned in the fifth embodiment is identical with the one in FIG. 2 shown in the first embodiment. Meanwhile, the OFDM receiver concerned in the fifth embodiment is shown in FIG. 6. The OFDM receiver 103 in the fifth embodiment will be explained as follows using FIG. 6. The OFDM receiver 103 comprises an RF reception unit 601, an IQ imbalance compensator 602, an FFT unit 603, a distortion coefficient estimator 604, a compensation weight calculating unit 605, a channel estimator 606, a channel equalizer 607 and a decoder 608.

In the RF reception unit 601, the OFDM signal S601 received by the receiving antenna 104 is subject to frequency conversion into a baseband, then converted into a digital signal S602. The OFDM signal S602 output from the RF reception unit 601 is input to the IQ imbalance compensator 602. The IQ imbalance compensator 602 keeps the receiving OFDM signal input sequentially from the RF reception unit 601 in its memory until the weight is input from the compensation weight calculating unit 605. In addition, when the OFDM signal of the $1^{st}$ and $2^{nd}$ symbol zones including a pilot signal is input, the IQ imbalance compensator 602 inputs these signals to the FFT unit 603. The OFDM signal of the $1^{st}$ and $2^{nd}$ symbol zones input to the FFT unit 603 is divided into signals for each subcarrier by undergoing fast Fourier transform. Among the signals for each subcarrier of the $1^{st}$ and $2^{nd}$ symbol zones output from the FFT unit 603, signals corresponding to the pilot signal are input to the distortion coefficient estimator 604.

From the input pilot signal of the $1^{st}$ and $2^{nd}$ symbol zones, the distortion coefficient estimator 604 estimates a distortion coefficient with respect to the $\pm 7^{th}$ subcarrier to which the pilot signal is transmitted. The signal S605 representing the estimated distortion coefficient is supplied to the compensation weight calculating unit 605.

In the compensation weight calculating unit 605, a weight to compensate the influence of the IQ imbalance is calculated from the estimated distortion coefficient, and a signal S606 representing the weight is supplied to the IQ imbalance compensator 602. The IQ imbalance compensator 602 compensates the OFDM signal kept in the memory and the receiving OFDM signal input sequentially from the RF reception unit 601 by using the calculated weight to remove the influence of the IQ imbalance. Subsequently, the IQ imbalance compensator 602 inputs the OFDM signal which has been compensated the influence of the IQ imbalance to the FFT unit 603.

The FFT unit 603 divides the input IQ imbalance compensated OFDM signal into signals for each subcarrier by fast Fourier transform. Among the output signals from the FFT unit 603, signals S604 corresponding to the channel estimation preamble signal are input to the channel estimator 606. Among the output signals from the FFT unit 603, signals S607 corresponding to the data signal are input to the channel equalizer 607.

In the channel estimator 606, channel response characteristic is estimated using the channel estimation preamble signal S604. The estimated channel response characteristic S608 is input to the channel equalizer 607. The channel equalizer 607 compensates the influence of transmission channel of the data signal S607 using the estimated channel response characteristic S608 and supplies the decoder 608 with the compensated data S609. In the decoder 608, transmitting data is reproduced by decoding.

The distortion coefficient estimator 604 used in the fifth embodiment may be any one of the distortion coefficient estimators used in the first to fourth embodiments. In the fifth embodiment, detailed process procedure of the compensation weight calculating unit 605 and the IQ imbalance compensator 602 will be explained in the case of using the distortion coefficient estimator 604 used in the third embodiment.

Firstly, the processing of the compensation weight calculating unit 605 will be explained. The compensation weight calculating unit 605 calculates the division result $\lambda(k)$ described in equation (48), from the distortion coefficient S605 estimated in the distortion coefficient estimator 604. Then, the compensation weight calculating unit 605 calculates the average value $\lambda_{Ave}$ of the division result $\lambda(k)$ which is calculated with respect to $k=\pm 7$, as shown in equation (49). Subsequently, the compensation weight calculating unit 605 estimates the IQ imbalance characteristic $\gamma_{IQ}$ from the average value $\lambda_{Ave}$ of the calculated division result. When describing the estimation value of the IQ imbalance characteristic $\gamma_{IQ}$ as $\gamma_{EVstIQ}$, the compensation weight calculating unit 405 calculates $\gamma_{EstIQ}$ by the calculation of equation (52). Then, the compensation weight calculating unit 605 uses the estimation value $\gamma_{EstIQ}$ of the IQ imbalance to estimate the inverse matrix $Q^{-1}$ time of $Q_{time}$ shown in equation (7). When describing the estimation value of $Q^{-1}_{time}$ as W, the compensation weight calculating unit 405 calculates W by the calculation of the following equation.

$$W = \begin{bmatrix} 1 & 0 \\ Im(\gamma^*_{EstIQ}) & Re(\gamma_{EstIQ}) \end{bmatrix}^{-1} \quad (64)$$

$$= \frac{1}{Re(\gamma_{EstIQ})}\begin{bmatrix} Re(\gamma_{EstIQ}) & 0 \\ -Im(\gamma^*_{EstIQ}) & 1 \end{bmatrix}$$

In the case of ignoring the term of thermal noise, $\gamma_{IQ} = \gamma_{EstIQ}$ is realized, and the estimation value W of $Q^{-1}_{time}$ and $Q^{-1}_{time}$ become identical values. The compensation weight calculating unit 605 supplies the calculated estimation value W to the IQ imbalance compensator 602 as the weight for IQ imbalance compensation (S606).

The processing of the IQ imbalance compensator 602 will be explained. The IQ imbalance compensator 602 compensates the OFDM signal kept in the memory and the OFDM signal sequentially input from the RF reception unit 601 to remove the influence of the IQ imbalance, using the weight S606.

The OFDM signal before compensation is defined by Y(k) of equation (6). In addition, the OFDM signal after IQ imbalance compensation is defined by $Y_{Eq}(t) = [y_{EqI}(t) \; y_{EqQ}(t)]^T$. Here, $y_{EqI}(t)$ represents the OFDM signal of an inphase component after IQ imbalance compensation, and $y_{EqQ}(t)$ represents the OFDM signal of an orthogonal component after IQ imbalance compensation. In this case, the IQ imbalance compensator 602 performs IQ imbalance compensation by calculating the following equation.

$$Y_{Eq}(t) = WY(t)(t = \Delta_{smp}, 2\Delta_{smp}, \ldots) \quad (65)$$

Here, $\Delta_{smp}$ is a sampling interval (time) of the OFDM signal Y(t). In the case of ignoring the term of thermal noise (n(t)=0), $W = Q^{-1}_{time}$ is realized, therefore, it is understood that the OFDM signal after compensation $Y_{Eq}(t)$ is able to remove the influence of the IQ imbalance $Q_{time}$ as in the following equation.

$$Y_{Eq}(t) = Q_{time}^{-1} Q_{time} X(t) = X(t) \; (t = \Delta_{smp}, 2\Delta_{smp}, \ldots) \quad (66)$$

As explained above, the OFDM receiver concerned in the fifth embodiment is configured to apply the IQ imbalance compensation to the OFDM signal prior to FFT input. Even when using such configuration, the influence of the IQ imbalance can be compensated, and the transmitting data can be demodulated with high accuracy.

Sixth Embodiment

Figure 7:
FIG. 7 illustrates a subcarrier arrangement of an OFDM signal transmitted according to another embodiment.

FIG. 7 shows a frame structure of an OFDM signal transmitted by the OFDM transmitter in a sixth embodiment. In the sixth embodiment, the subcarriers used for transmitting the pilot signals are $k = \pm 7, \pm 21$. However, this is not restricted, and as long as the subcarrier pairs being symmetric with respect to a center frequency ($0^{th}$ subcarrier) are used for the pilot signals, an arbitrary subcarrier can be used for transmitting the pilot signals. In addition, in the sixth embodiment, the number of subcarriers used for transmitting the pilot signals is 4. However, this is not restricted, and it is possible to use any even numbers of subcarriers.

In the sixth embodiment, the transmitting pilot signal $\{p_{Tx}(+k, n_1), p_{Tx}(-k, n_1)\}$ of the $n_1$st symbol zone and the pilot signal $\{p_{Tx}(+k, n_2), p_{Tx}(-k, n_2)\}$ of the $n_2$nd symbol zone satisfy the condition of the following equation.

$$p_{Tx}(+k, n_1)p_{Tx}^*(-k, n_2) - p_{Tx}(+k, n_2)p_{Tx}^*(-k, n_1) \neq 0$$
$$(k = +7, +21) \quad (67)$$

In addition, preferably, $\{p_{Tx}(+k, n_1), p_{Tx}(-k, n_1)\}$ and $\{p_{Tx}(+k, n_2), p_{Tx}(-k, n_2)\}$ satisfy the condition of the following equation.

$$p_{Tx}(+k, n_1)p_{Tx}(+k, n_2) + p_{Tx}^*(-k, n_1)p_{Tx}^*(-k, n_2) = 0$$
$$(k = +7, +21) \quad (68)$$

In the sixth embodiment, the combination of symbol numbers $\{n_1, n_2\}$ that satisfies equation (67) is $\{1, 2\}$. In other words, the pilot signal $\{p_{Tx}(+k, n_1), p_{Tx}(-k, n_1)\}$ of the $1^{st}$ symbol zone and the pilot signal $\{p_{Tx}(+k, n_2), p_{Tx}(-k, n_2)\}$ of the $2^{nd}$ symbol zone satisfy equation (67). In the sixth embodiment, the $1^{st}$ and $2^{nd}$ symbols include pilot signals which satisfy equation (67), however, this is not restricted, and the pilot signal satisfying equation (67) may be included in any two symbols (for example, the $3^{rd}$ symbol and the $7^{th}$ symbol, the preamble for channel estimation and the $4^{th}$ symbol).

The OFDM receiver in the present embodiment is identical with FIG. 4 concerned in the first embodiment, except that the operations of the distortion coefficient estimator 404 and the compensation weight calculating unit 405 are different. In the following, the operations of the distortion coefficient estimator 404 and the compensation weight calculating unit 405 used in the present embodiment will be explained.

Firstly, the processing of the distortion coefficient estimator 404 will be explained. To start with, the distortion coefficient estimator 404 receives a receiving pilot signal of the $1^{st}$ and $2^{nd}$ symbol zones output from the FFT unit 402.

In this case, the receiving pilot signal $P_{Rx}(k)$ received in the $1^{st}$ and $2^{nd}$ symbol zones in the $k = \pm 7^{th}, \pm 21^{st}$ subcarrier by the distortion coefficient estimator 404 can be described as in equations (38).

Then, from the receiving pilot signal $P_{Rx}(k)$ and the known transmitting pilot signal $P_{Rx}(k)$, the distortion coefficient estimator 404 estimates the distortion coefficients $\alpha(k)$ and $\beta(k)$ with respect to subcarrier $k = \pm 7^{th}, \pm 21^{st}$ to which a transmitting pilot signal is allocated. The estimation value of distortion coefficients $\alpha(k)$ and $\beta(k)$ are respectively described as $\alpha_{Est}(k)$ and $\beta_{Est}(k)$, and the estimation vector $C_{Est}(k)$ of the distortion coefficient is defined by equation (43). Here, the distortion coefficient estimator 404 calculates the estimation value vector $C_{Est}(k)$ of the distortion coefficient by the calculation of the following equation.

$$C_{Est}(k) = P_{Tx}^{-1}(k)P_{Rx}(k) \quad (69)$$

$$= \frac{1}{p_{Tx}(k,1)p_{Tx}^*(-k,2) - p_{Tx}(k,2)p_{Tx}^*(-k,1)} \times$$

$$\begin{bmatrix} p_{Tx}^*(-k,2) & -p_{Tx}^*(-k,1) \\ -p_{Tx}(k,2) & p_{Tx}(k,1) \end{bmatrix}\begin{bmatrix} p_{Rx}(k,1) \\ p_{Rx}(k,2) \end{bmatrix}$$

$$(k = \pm 7, \pm 21)$$

In the sixth embodiment, as the transmitting pilot signal satisfies equation (67), it is possible to estimate the distortion coefficient $C_{Est}(k)$ by the calculation of the above equation. In the case of ignoring the term of thermal noise (M(k)=0), when equation (38) is substituted into equation (69), it is understood that the estimation value of the distortion coefficient $C_{Est}(k)$ (i.e., $\alpha_{Est}(k)$ and $\beta_{Est}(k)$) becomes identical values with the actual distortion coefficient C(k) (i.e., α(7) and β(k)). The distortion coefficient estimator 404 supplies the distortion coefficient $C_{Est}(k)$ (i.e., $\alpha_{Est}(k)$ and $\beta_{Est}(k)$) estimated by the calculation of equation (69) to the compensation weight calculating unit 405 (S404).

The processing of the compensation weight calculating unit 405 will be explained. The compensation weight calculating unit 405 calculates the division result w(k) described by the following equation from the distortion coefficient S404 estimated in the distortion coefficient estimator 404.

$$w(k) = \frac{\beta_{Est}(-k)}{\alpha_{Est}^*(k)} (k = \pm 7, \pm 21) \tag{70}$$

Then, the compensation weight calculating unit 405 calculates the average value $w_{Ave}$ of the division result w(k) calculated with respect to $k=\pm 7, \pm 21$, as described in the following equation.

$$w_{Ave} = \frac{1}{4} \sum_{k=\pm 7, \pm 21} w(k) \tag{71}$$

Further, in the sixth embodiment, as shown in the above equation, the division result w(+7) with respect to k=+7, the division result w(-7) with respect to k=-7, the division result w(+21) with respect to k=+21 and the division result w(-21) with respect to k=-21 are averaged with the same weight. However, this is not restricted, therefore, when averaging, it is also fine to multiply w(+7), w(-7), w(+21) and w(-21) by different weight coefficients ρ(k) as in the example of the following equation.

$$w_{Ave} = \frac{1}{\sum_{k=\pm 7} \rho(k)} \sum_{k=\pm 7, \pm 21} \rho(k) w(k) \tag{72}$$

$$\rho(k) = |\alpha_{Est}(k)|$$

The compensation weight calculating unit 405 considers the calculated average value $w_{Ave}$ as the weight for IQ imbalance compensation and supplies the IQ imbalance compensator 403 with the signal indicating such weight (S405). The IQ imbalance compensator 403 compensates the influence of the IQ imbalance for the channel estimation preamble signal and the data signal likewise in the first embodiment, by calculating the equations (25) and (26) using the average value $w_{Ave}$ of the division result.

In addition, in the sixth embodiment, as shown in equation (71), the division result calculated from a plurality of pilot subcarriers are averaged. Therefore, the estimation accuracy of the weight under a thermal noise environment is improved, thereby improving the compensation accuracy for the IQ imbalance compensator 403.

Seventh Embodiment

A seventh embodiment of the present invention will be explained. The frame structure of the transmitting OFDM signal transmitted by the OFDM transmitter in the present embodiment is identical to the one shown in FIG. 7. In the seventh embodiment, when assuming that n=1, 2, 3, . . . , the pilot signal transmitted to the nth symbol $p_{Tx}(+k, n)$ and $p_{Tx}(-k, n)$ and the pilot signal transmitted to the n+1th symbol $p_{Tx}(+k, n+1)$ and $p_{Tx}(-k, n+1)$ satisfy the condition of the following equation.

$$p_{Tx}(+k, n)p_{Tx}^*(-k, n+1) - p_{Tx}(+k, n)p_{Tx}^*(-k, n+1) \neq 0 \tag{73}$$

$$(k = +7, +21, n = 1, 2, 3, \ldots)$$

Further, it is preferred that $p_{Tx}(+k, n)$, $p_{Tx}(-k, n)$, $p_{Tx}(+k, n+1)$ and $p_{Tx}(-k, n+1)$ satisfy the condition of the following equation.

$$p_{Tx}(+k, n)p_{Tx}(+k, n+1) + p_{Tx}^*(-k, n)p_{Tx}^*(-k, n+1) \neq 0 \tag{74}$$

$$(k = +7, +21, n = 1, 2, 3, \ldots)$$

The OFDM receiver in the seventh embodiment is identical to FIG. 4 used in the first embodiment, except that the operations of the distortion coefficient estimator 404 and the compensate weight calculating unit 405 are different. In the following, the operations of the distortion coefficient estimator 404 and the compensation weight calculating unit 405 used in the present embodiment will be explained.

Firstly, the processing of the distortion coefficient estimator 404 will be explained. To start with, the distortion coefficient estimator 404 receives a receiving pilot signal of the nth symbol zone and n+1th symbol zone from the FFT unit 402. To simplify the following explanations, the receiving pilot signals received by the distortion coefficient estimator 404 in the nth and n+1th symbol zones in the $k=\pm 7^{th}, \pm 21^{st}$ subcarrier are defined by vector $P_{Rx}(k, n)$ in the following equation.

$$P_{Rx}(k, n) = \begin{bmatrix} p_{Rx}(k, n) \\ p_{Rx}(k, n+1) \end{bmatrix} \tag{75}$$

$$(k = +7, +21, n = 1, 2, 3, \ldots)$$

In this case, the receiving pilot signal $P_{Rx}(k, n)$ received in the nth and n+1th symbol zones in the $k=\pm 7^{th}, \pm 21^{st}$ subcarrier by the distortion coefficient estimator 404 can be described by equation (8) as in the following equation.

$$P_{Rx}(k, n) = P_{Tx}(k, n)C(k) + M(k, n) \tag{76}$$

where $P_{Tx}(k, n)$, $C(k)$ and $M(k, n)$ are respectively a transmitting pilot signal matrix, a distortion coefficient vector and a noise signal vector, which are defined by the following equations.

$$P_{Tx}(k, n) = \begin{bmatrix} p_{Tx}(k, n) & p_{Tx}^*(-k, n) \\ p_{Tx}(k, n+1) & p_{Tx}^*(-k, n+1) \end{bmatrix} \tag{77}$$

$$C(k) = \begin{bmatrix} \alpha(k) \\ \beta(k) \end{bmatrix} \tag{78}$$

$$M(k, n) = \begin{bmatrix} m(k, n) \\ m(k, n+1) \end{bmatrix} \tag{79}$$

Then, from the received pilot signal $P_{Rx}(k, n)$ and a known transmitting pilot signal $P_{Rx}(k, n)$, the distortion coefficient estimator 404 estimates distortion coefficients α(k) and β(k) with respect to subcarriers k=±7, ±21, to which the pilot signals are allocated. The estimation value of distortion coefficients α(k) and β(k) are respectively described as $\alpha_{Est}(k, n)$ and $\beta_{Est}(k, n)$ and the estimation value vector $C_{Est}(k, n)$ of the distortion coefficient is defined by the following equation.

$$C_{Est}(k, n) = \begin{bmatrix} \alpha_{Est}(k, n) \\ \beta_{Est}(k, n) \end{bmatrix} \quad (80)$$

The distortion coefficient estimator 404 calculates the estimation value vector $C_{Est}(k, n)$ of the distortion coefficient by the following equation.

$$\begin{aligned} C_{Est}(k, n) &= P_{Tx}^{-1}(k, n) P_{Rx}(k, n) \quad (81) \\ &= \frac{1}{p_{Tx}(k, n) p_{Tx}^*(-k, n+1) - p_{Tx}(k, n+1) p_{Tx}^*(-k, n)} \times \\ &\begin{bmatrix} p_{Tx}^*(-k, n+1) & -p_{Tx}^*(-k, n) \\ -p_{Tx}(k, n+1) & p_{Tx}(k, n) \end{bmatrix} \begin{bmatrix} p_{Rx}(k, n) \\ p_{Rx}(k, n+1) \end{bmatrix} \\ &(k = \pm 7 \pm 21, n = 1, 2, 3, \ldots) \end{aligned}$$

In the seventh embodiment, as the transmitting pilot signal satisfies equation (73), it is possible to estimate the distortion coefficient $C_{Est}(k, n)$ (i.e., $\alpha_{Est}(k, n)$ and $\beta_{Est}$) by the calculation of the above equation. In the case of ignoring the terms of thermal noise (M(k,n)=0), when substituting equation (76) into equation (81), it is understood that the estimation value $C_{Est}(k, n)$ (i.e., $\alpha_{Est}(k, n)$ and $\beta_{Est}(k, n)$) of the distortion coefficient will have identical values with the actual distortion coefficient C(k) (i.e., α(k) and β(k)). The distortion coefficient estimator 404 supplies the distortion coefficient $C_{Est}(k, n)$ (i.e., $\alpha_{Est}(k, n)$ and $\beta_{Est}(k, n)$) estimated by the calculation of equation (81) to the compensation weight calculating unit 405 (S404).

The processing of compensation weight calculating unit 405 will be explained. The compensation weight calculating unit 405 calculates the division result w(k, n) described in the following equation from the distortion coefficient S404 estimated in the distortion coefficient estimator 404.

$$w(k, n) = \frac{\beta_{Est}(-k, n)}{\alpha_{Est}^*(k, n)} \quad (82)$$
$$(k = \pm 7, \pm 21, n = 1, 2, 3, \ldots)$$

Then, the compensation weight calculating unit 405 calculates the average value $w_{Ave}$ of the division result w(k, n) calculated with respect to k=±7, ±21, n=1, 2, ... N as shown in the following equation.

$$w_{Ave} = \frac{1}{4N} \sum_{n=1,2\ldots N} \sum_{k=\pm 7, \pm 21} w(k, n) \quad (83)$$

In the seventh embodiment, as show in the above equation, all w(k, n) are averaged with the same weight. However, this is not restricted, therefore, when averaging, it is also fine to multiply w(k, n) by different weights depending on k and n. The number of times N which averages w(k, n) of equation (83) may be arbitrary, however, by increasing N, in return for the time required to calculate the average value $w_{Ave}$, the estimation accuracy of $w_{Ave}$ under a noise thermal environment can be improved. Accordingly, it is preferred that the number of times N to perform averaging is decided in consideration of both the processing delay and the power of thermal noise. The compensation weight calculating unit 405 supplies the average value $w_{Ave}$ of the calculated division result to the IQ imbalance compensator 403 as the weight for IQ imbalance compensation (S405).

By calculating the equations (25) and (26) using the average value $w_{Ave}$ of the division result, the IQ imbalance compensator 403 is able to compensate the influence of the IQ imbalance for the channel estimation preamble signal and data signal, likewise in the first embodiment.

Further, as shown in equation (83), in the seventh embodiment, the division result calculated from pilot signals of a plurality of different symbols and different subcarriers is averaged. Therefore, estimation accuracy of the weight under the thermal environment is improved and the compensation accuracy for the IQ imbalance compensator 403 can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication method comprising:
   generating an OFDM signal containing a first OFDM symbol having a first transmitting pilot signal and a second transmitting pilot signal respectively allocated to a first subcarrier and a second subcarrier being symmetric with respect to a center frequency on a frequency axis, and a second OFDM symbol having a third transmitting pilot signal and a fourth transmitting pilot signal respectively allocated to the first subcarrier and the second subcarrier, a difference between a product of the first transmitting pilot signal and a complex conjugate of the fourth transmitting pilot signal and a product of the third transmitting pilot signal and a complex conjugate of the second transmitting pilot signal being non-zero;
   transmitting the OFDM signal;
   receiving the OFDM signal by using orthogonal demodulation to output a received OFDM signal;
   extracting a first received pilot signal and a second received pilot signal in a first OFDM symbol zone of the received OFDM signal, the first receiving pilot signal and the second receiving pilot signal respectively corresponding to the first subcarrier and the second subcarrier;
   extracting a third received pilot signal and a fourth received pilot signal in the second OFDM symbol zone of the receiving OFDM signal, the third receiving pilot signal and the fourth receiving pilot signal respectively corresponding to the first subcarrier and the second subcarrier;
   estimating from the first received pilot signal and the third received pilot signal a first coefficient representing a change component of each of an amplitude and a phase which are occurred in the first subcarrier;
   estimating from the second received pilot signal and the fourth received pilot signal a second coefficient representing an interference component provided to the second subcarrier by the first subcarrier;

calculating from the first coefficient and the second coefficient a weight to be used for compensating influences of an amplitude error and a phase error occurred in the received OFDM signal upon the orthogonal demodulation;

compensating the receiving OFDM signal in accordance with the calculated weight to obtain a compensated OFDM signal; and decoding the compensated OFDM signal.

2. An OFDM transmitter comprising:

an OFDM signal generator to generate an OFDM signal containing a first OFDM symbol having a first transmitting pilot signal and a second transmitting pilot signal respectively allocated to a first subcarrier and a second subcarrier being symmetric with respect to a center frequency on a frequency axis, and a second OFDM symbol having a third transmitting pilot signal and a fourth transmitting pilot signal respectively allocated to the first subcarrier and the second subcarrier, a difference between a product of the first transmitting pilot signal and a complex conjugate of the fourth transmitting pilot signal and a product of the third transmitting pilot signal and a complex conjugate of the second transmitting pilot signal being non-zero; and a transmitting unit configured to transmit the OFDM signal.

3. The apparatus according to claim 2, wherein, further in the OFDM signal, a sum of the product of the first transmitting pilot signal and the third transmitting pilot signal and the product of the complex conjugate of the second transmitting pilot signal and the complex conjugate of the fourth transmitting pilot signal is zero.

4. An OFDM receiver comprising:

a receiving unit configured to receive by orthogonal demodulation an OFDM signal containing a first OFDM symbol having a first transmitted pilot signal and a second transmitted pilot signal respectively allocated to a first subcarrier and a second subcarrier being symmetric with respect to a center frequency on a frequency axis, and a second OFDM symbol having a third transmitted pilot signal and a fourth transmitted pilot signal respectively allocated to the first subcarrier and the second subcarrier, a difference between a product of the first transmitted pilot signal and the complex conjugate of the fourth transmitted pilot signal and a product of the third transmitted pilot signal and the complex conjugate of the second transmitted pilot signal being non-zero;

an estimator to estimate from a first received pilot signal corresponding to the first transmitted pilot signal of the received OFDM signal and a third pilot received pilot signal corresponding to the third transmitted pilot signal of the received OFDM signal, a first coefficient representing a change component of each of an amplitude and a phase occurred in the first subcarrier, and to estimate from the second received pilot signal corresponding to the second transmitted pilot signal of the received OFDM signal and a fourth received pilot signal corresponding to the fourth transmitted pilot signal of the received OFDM signal, a second coefficient representing an interference component provided to the second subcarrier by the first subcarrier;

a calculator to calculate from the first coefficient and the second coefficient, a weight to be used for compensating influences of an amplitude error and a phase error occurred in the received OFDM signal upon the orthogonal demodulation;

a compensator to compensate the received OFDM signal in accordance with the weight to obtain a compensated OFDM signal; and a decoder to decode the compensated OFDM signal.

5. The OFDM receiver according to claim 4, wherein, in the OFDM signal received by the receiving unit, a sum of the product of the first transmitted pilot signal and the third transmitted pilot signal and the product of the complex conjugate of the second transmitted pilot signal and the complex conjugate of the fourth transmitted pilot signal is zero.

6. The OFDM receiver according to claim 4, wherein the estimator estimates the first coefficient by a following equation;

$$\frac{p^*_{Tx}(-K, n_2)p_{Rx}(+K, n_1) - p^*_{Tx}(-K, n_1)p_{Rx}(+K, n_2)}{p_{Tx}(+K, n_1)p^*_{Tx}(-K, n_2) - p_{Tx}(+K, n_2)p^*_{Tx}(-K, n_1)}$$

where, $p_{Tx}(+K, n_1)$, $p_{Tx}(-K, n_1)$, $p_{Tx}(+K, n_2)$ and $p_{Tx}(-K, n2)$ respectively represent the first transmitted pilot signal, the second transmitted pilot signal, the third transmitted pilot signal and the fourth transmitted pilot signal, $p_{Rx}(+K, n_1)$, $p_{Rx}(-K, n_1)$, $p_{Rx}(+K, n_2)$ and $p_{Rx}(-K, n2)$ respectively represent the first received pilot signal, the second received pilot signal, the third received pilot signal and the fourth received pilot signal, wherein k is a subcarrier number, $n_1$ is a first OFDM symbol, $n_2$ is a second OFDM symbol, and * represents complex conjugate calculation.

7. The OFDM receiver according to claim 4, wherein the estimator estimates the second coefficient by a following equation;

$$\frac{-p_{Tx}(-K, n_2)p_{Rx}(-K, n_1) + p_{Tx}(-K, n_1)p_{Rx}(-K, n_2)}{p_{Tx}(-K, n_1)p^*_{Tx}(+K, n_2) - p_{Tx}(-K, n_2)p^*_{Tx}(+K, n_1)}$$

where, $p_{Tx}(+K, n_1)$, $p_{Tx}(-K, n_1)$, $p_{Tx}(+K, n_2)$ and $p_{Tx}(-K, n2)$ respectively represent the first transmitted pilot signal, the second transmitted pilot signal, the third transmitted pilot signal and the fourth transmitted pilot signal, $p_{Rx}(+K, n_1)$, $p_{Rx}(-K, n_1)$, $p_{Rx}(+K, n_2)$ and $p_{Rx}(-K, n2)$ respectively represent the first received pilot signal, the second received pilot signal, the third received pilot signal and the fourth received pilot signal, wherein k is the subcarrier number, $n_1$ is a first OFDM symbol, $n_2$ is a second OFDM symbol, and * represents complex conjugate calculation.

8. The OFDM receiver according to claim 4, wherein the calculator calculates the weight by a following equation;

$$\frac{\beta_{Est}(-K)}{\alpha^*_{Est}(+K)}$$

where, $\alpha_{Est}(+K)$ and $\beta_{Est}(-K)$ represent the first coefficient and the second coefficient, k is a subcarrier number, and * represents complex conjugate calculation.

9. The OFDM receiver according to claim 4, wherein the calculator calculates the weight by averaging values obtained by a following equation;

$$\frac{\beta_{Est}(-K)}{\alpha^*_{Est}(+K)}$$

where, $\alpha_{Est}(+K)$ and $\beta_{Est}(-K)$ represent the first coefficient and the second coefficient, k is a subcarrier number, and * represents complex conjugate calculation.

10. The OFDM receiver according to claim 4, wherein the calculator calculates the weight as a matrix by a following equation;

$$\frac{1}{\gamma_{EstIQ} + \gamma^*_{EstIQ}} \begin{bmatrix} 1 + \gamma_{EstIQ} & -1 + \gamma_{EstIQ} \\ -1 + \gamma^*_{EstIQ} & 1 + \gamma^*_{EstIQ} \end{bmatrix}$$

where, $\gamma_{EstIQ}$ represents;

$$\frac{1 - \lambda_{Ave}}{1 + \lambda_{Ave}}$$

λAve represents an (no antecedent basis) average value of;

$$\frac{\beta_{Est}(-K)}{\alpha^*_{Est}(+K)}$$

$\alpha_{Est}(+K)$ and $\beta_{Est}(-K)$ represent the first coefficient and the second coefficient, k is a subcarrier number, and * represents complex conjugate calculation.

11. The OFDM receiver according to claim 4, wherein the calculator calculates the weight as a matrix by a following equation;

$$W = \frac{1}{\text{Re}(\gamma_{EstIQ})} \begin{bmatrix} \text{Re}(\gamma_{EstIQ}) & 0 \\ -\text{Im}(\gamma^*_{Estlq}) & 1 \end{bmatrix}$$

where, $\gamma_{EstIQ}$ represents;

$$\frac{1 - \lambda_{Ave}}{1 + \lambda_{Ave}}$$

λAve represents an average value of;

$$\frac{\beta_{Est}(-K)}{\alpha^*_{Est}(+K)}$$

$\alpha_{Est}(+K)$ and $\beta_{Est}(-K)$ represent the first coefficient and the second coefficient, k is a subcarrier number, and * represents complex conjugate calculation.

12. The OFDM receiver according to claim 8, wherein the OFDM signal received by the receiving unit further comprises a third OFDM symbol having a first transmitted information signal and a second transmitted information signal respectively allocated to a third subcarrier and a fourth subcarrier positioned symmetric with regard to a center frequency on the frequency axis; and the compensator compensates the received OFDM signal by a following equation;

$$u_{Rx}(k) - w u_{Rx}^*(-k)$$

where, $u_{Rx}(k)$ represents a first received information signal corresponding to the first transmitted information signal of the received OFDM signal, $u_{Rx}(-k)$ represents a second received information signal corresponding to the second transmitted information signal within the received OFDM signal, * represents complex conjugate calculation, and w represents the weight.

13. The OFDM receiver according to claim 8, wherein the receiving unit receives the OFDM signal further including a third OFDM symbol having a first transmitted information signal and a second transmitted information signal respectively allocated to a third subcarrier and a fourth subcarrier positioned symmetric with regard to a center frequency on the frequency axis; and the compensator compensates the received OFDM signal by a following equation;

$$u_{Rx}(k) - w u_{Rx}^*(-k)$$

where, $u_{Rx}(k)$ represents a first received information signal corresponding to the first transmitted information signal within the received OFDM signal, $u_{Rx}(-k)$ represents a second received information signal corresponding to the second transmitted information signal within the received OFDM signal, * represents a complex conjugate calculation, and w represents the weight.

14. The OFDM receiver according to claim 10, wherein the receiving unit receives the OFDM signal further including a third OFDM symbol having a first transmitted information signal and a second transmitted information signal respectively allocated to a third subcarrier and a fourth subcarrier positioned symmetric with regard to a center frequency on the frequency axis; and the compensator compensates the received OFDM signal by a following equation;

$$U_{Eq}(k) = W U_{RX}(k)$$

where, $U_{Eq}(k)$ represents vector $[u_{Eq}(k)\ u^*_{Eq}(-k)]^T$, wherein $u_{Eq}(k)$ represents a first received information signal corresponding to the first transmitted information signal within the compensated received OFDM signal and $u^*_{Eq}(-k)$ represents a complex conjugate value of a second received information signal corresponding to the second transmitted information signal within the compensated received OFDM signal as its components; $U_{Rx}(k)$ represents vector $[u_{Rx}(k)\ u^*_{Rx}(-k)]^T$, wherein $u_{Rx}(k)$ represents a first received information signal corresponding to the first transmitted information signal of the received OFDM signal before the compensation and $u^*_{Rx}(-k)$ represents a complex conjugate value of a second received information signal corresponding to the second transmitted information signal of the received OFDM signal before the compensation as its components; T represents a transpose function; and W represents the weight.

15. The OFDM receiver according to claim 11, wherein the received OFDM signal comprises an inphase component and orthogonal component; and the compensator compensates the received OFDM signal according to a following equation depending on the inphase component and the orthogonal component;

$$Y_{Eq}(t) = W Y_{Rx}(t)$$

where, $Y_{Eq}(t)$ represents vector $[y_{EqI}(t)\ y_{EqQ}(t)]^T$, wherein $y_{EqI}(t)$ represents a compensated inphase component in time t and $y_{EqQ}(t)$ represents a compensated orthogonal component in time t as its components; $Y_{Rx}(t)$ represents vector $[y_I(t)\ y_Q(t)]^T$, wherein $y_I(t)$ represents the inphase component before compensation in time t and $y_Q(t)$ represents the orthogonal component before compensation in time t as its components; T represents a transpose function; and W represents the weight.

* * * * *